US006947018B1

(12) United States Patent
Yamazaki

(10) Patent No.: US 6,947,018 B1
(45) Date of Patent: Sep. 20, 2005

(54) IMAGE DISPLAY APPARATUS, DRIVING CIRCUIT FOR IMAGE DISPLAY APPARATUS, AND IMAGE DISPLAY METHOD

(75) Inventor: Tatsuro Yamazaki, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/218,095

(22) Filed: Dec. 22, 1998

(30) Foreign Application Priority Data

Dec. 27, 1997 (JP) .............................................. 9-369234
Dec. 18, 1998 (JP) .............................................. 10-360877

(51) Int. Cl.[7] ............................ G09G 3/22; G09G 3/30; H04N 5/20
(52) U.S. Cl. ......................... 345/75.2; 345/77; 348/687
(58) Field of Search ............................... 345/74.1, 75.1, 345/75.2, 76, 77, 102; 348/556, 615, 687

(56) References Cited

U.S. PATENT DOCUMENTS 4,514,727 A * 4/1985 Van Antwerp .............. 345/148
4,559,535 A * 12/1985 Watkins et al. ............... 345/77
4,589,022 A * 5/1986 Prince et al. ............... 348/602
4,904,895 A 2/1990 Tsukamoto et al. ......... 313/336
5,066,833 A 11/1991 Zalenski ...................... 178/19
5,162,789 A * 11/1992 Moriya et al. ............. 345/75.1
5,262,698 A * 11/1993 Dunham .................. 315/169.1
5,477,110 A * 12/1995 Smith et al. ............. 315/169.3
5,493,183 A * 2/1996 Kimball ....................... 315/308
5,583,578 A * 12/1996 Tateishi ...................... 348/615
5,610,667 A * 3/1997 Hush ........................... 348/796
5,631,664 A * 5/1997 Adachi et al. ................ 345/74
5,701,134 A * 12/1997 Lambert et al. .............. 345/74
5,708,451 A * 1/1998 Baldi ........................ 345/75.2
5,734,361 A 3/1998 Suzuki et al. ................. 345/74
5,742,266 A * 4/1998 Onozuka ................... 345/74.1
5,786,669 A * 7/1998 Kobori et al. ........... 315/169.3
5,786,801 A * 7/1998 Ichise ......................... 345/102
5,818,403 A * 10/1998 Nakamura et al. ............ 345/74
5,847,515 A * 12/1998 Lee et al. ................ 315/169.1
5,856,812 A * 1/1999 Hush et al. ................ 345/74.1
5,929,828 A * 7/1999 Beeteson et al. ............. 345/74
5,969,709 A * 10/1999 Kim ........................... 345/147
6,069,598 A * 5/2000 Hansen ........................ 345/74
6,121,942 A * 9/2000 Sanou et al. ................ 313/495
6,169,371 B1 * 1/2001 Zimlich et al. .......... 315/169.1
6,184,850 B1 * 2/2001 Suzuki et al. .............. 345/74.1

FOREIGN PATENT DOCUMENTS

| | | |
|---|---|---|
| JP | 60-138534 | 7/1985 |
| JP | 01-031332 | 2/1989 |
| JP | 02-257551 | 10/1990 |
| JP | 03-055738 | 3/1991 |
| JP | 3-91365 | 4/1991 |
| JP | 04-028137 | 1/1992 |
| JP | 7-326283 | 12/1995 |
| JP | 8-234690 | 9/1996 |
| JP | 9-97033 | 4/1997 |

OTHER PUBLICATIONS

M. Hartwell and C.G. Fonstad, "IEEE Trans. ED Conf.", p. 519 (1975).
Hisashi Araki, et al., "Vacuum", vol. 26, No. 1, p. 22 (1983).

* cited by examiner

*Primary Examiner*—Xiao Wu
*Assistant Examiner*—Kevin M. Nguyen
(74) *Attorney, Agent, or Firm*—Fitzpatrick, Cella, Harper & Scinto

(57) ABSTRACT

An image display apparatus includes an image display member having a plurality of light-emitting portions, electron-emitting devices for emitting electrons and causing the light-emitting portions to emit light in accordance with an input image signal, and an adjustment unit for differentially adjusting the light emitting brightness for the plurality of light-emitting portions at different positions of the image display member, when an input image signal designates the same brightness for the plurality of light-emitting portions.

4 Claims, 23 Drawing Sheets

5/23

IMAGE DISPLAY APPARATUS, DRIVING CIRCUIT FOR IMAGE DISPLAY APPARATUS, AND IMAGE DISPLAY METHOD

BACKGROUND OF THE INVENTION

1. Field of the Invention

The present invention relates to an image display apparatus, a driving circuit for the image display apparatus, and an image display method.

2. Description of the Related Art

In recent years, large flat-screen display apparatuses have extensively been studied and developed. The present inventors have studied a large flat-screen display apparatus using a cold cathode device as an electron source.

Conventionally, two types of devices, namely hot and cold cathode devices, are known as electron-emitting devices. Known examples of cold cathode devices are surface-conduction type electron-emitting devices, field emission type electron-emitting devices (to be referred to as FE type electron-emitting devices hereinafter), and metal/insulator/metal type electron-emitting devices (to be referred to as MIM type electron-emitting devices hereinafter).

A known example of surface-conduction type electron-emitting devices is described in, e.g., M. I. Elinson, "Radio Eng. Electron Phys., 10, 1290-(1965) and other examples will be described later.

A surface-conduction type electron-emitting device utilizes the phenomenon that electrons are emitted from a small-area thin film formed on a substrate by causing a current to flow parallel through the film surface. Surface-conduction-conduction type electron-emitting devices include electron-emitting devices using an Au thin film [G. Dittmer, "Thin Solid Films", 9,317 (1972)], an $In_2O_3/SnO_2$ thin film [M. Hartwell and C. G. Fonstad, "IEEE Trans. ED Conf.", 519 (1975)], a carbon thin film [Hisashi Araki et al., "Vacuum", Vol. 26, No. 1, p. 22 (1983)], and the like, in addition to an $SnO_2$ thin film according to Elinson mentioned above.

FIG. 22 is a plan view showing the device by M. Hartwell et al, described above as a typical example of the device structures of surface-conduction type electron-emitting devices. Referring to FIG. 22, reference numeral 3001 denotes a substrate; and 3004, a conductive thin film made of a metal oxide formed by sputtering. This conductive thin film 3004 has an H-shaped pattern, as shown having FIG. 22. An electron-emitting portion 3005 is formed by performing electrification processing (referred to as forming processing to be described later) with respect to the conductive thin film 3004. An interval L in FIG. 22 is set to 0.5 to 1 mm, and a width W is set to 0.1 mm. The electron-emitting portion 3005 is shown having a rectangular shape at the center of the conductive thin film 3004 for the sake of illustrative convenience. However, this does not exactly show the actual position and shape of the electron-emitting portion.

In the above surface-conduction type electron-emitting devices by M. Hartwell et al. and the like, typically the electron-emitting portion 3005 is formed by performing electrification processing called forming processing for the conductive thin film 3004 before electron emission. In the forming processing, for example, a constant DC voltage or a DC voltage which increases at a very low rate of, e.g., 1

V/min is applied across the two ends of the conductive thin film 3004 so as to partially destroy or deform the conductive thin film 3004, thereby forming the electron-emitting portion 3005 with an electrically high resistance. Note that the destroyed or deformed part of the conductive thin film 3004 has a fissure. Upon application of an appropriate voltage to the conductive thin film 3004 after the forming processing, electrons are emitted near the fissure.

Known examples of FE type electron-emittina devices are described in W. P. Dyke and W. W. Dolan, "Field emission", Advance in Electron Physics, 8, 89 (1956) and C. A. Spindt, "Physical properties of thin film field emission cathodes with molybdenium cones", J. Appl. Phys., 47, 5248 (1976).

FIG. 23 is a sectional view showing the device by C. A. Spindt et al, described above as a typical example of an FE type device structure. Referring to FIG. 23, reference numeral 3010 denotes a substrate; numeral 3011 denotes emitter wiring made of a conductive material; numeral 3012 denotes an emitter cone; numeral 3013 denotes an insulating layer; and numeral 3014 denotes a gate electrode. In this device, a voltage is applied between the emitter cone 3012 and the gate electrode 3014 to emit electrons from the distal end portion of the emitter cone 3012. As another FE type device structure, there is an example in which an emitter and a gate electrode are arranged on a substrate to be almost parallel to the surface of the substrate, in addition to the multilayered structure of FIG. 23.

A known example of MIM type electron-emitting devices is described in C. A. Mead, "Operation of Tunnel-Emission Devices", J. Appl. Phys., 32,646 (1961). FIG. 24 shows a typical example of the MIM type device structure. FIG. 24 is a sectional view of the MIM type electron-emitting device. Referring to FIG. 24, reference numeral 3020 denotes a substrate; numeral 3021 denotes a lower electrode made of a metal; numeral 3022 denotes a thin insulating layer having a thickness of about 100 A; and numeral 3023 denotes an upper electrode made of a metal and having a thickness of about 80 to 300 A. In the MIM type electron-emitting device, an appropriate voltage is applied between the upper electrode 3023 and the lower electrode 3021 to emit electrons from the surface of the upper electrode 3023.

Since the above described cold cathode devices can emit electrons at a temperature lower than that for hot cathode devices, they do not require any heater. The cold cathode device therefore has a structure that is more simple than that of the hot cathode device and can be micropatterned. Even if a large number of devices are arranged on a substrate at a high density, problems such as heat fusion of the substrate hardly arise. In addition, the response speed of the cold cathode device is high, while the response speed of the hot cathode device is low because it operates upon heating by a heater. For this reason, applications of cold cathode devices have enthusiastically been studied.

Of cold cathode devices, the above surface-conduction type electron-emitting devices are advantageous because they have a simple structure and can be easily manufactured. For this reason many devices can be formed on a wide area. As disclosed in Japanese Patent Laid-Open No. 64-31332 filed by the present applicant, a method of arranging and driving a lot of devices has been studied.

Regarding applications of surface-conduction type electron-emitting devices to, e.g., image forming apparatuses such as an image display apparatus and an image recording apparatus, electron sources, and the like have been studied.

As an application to image display apparatuses, in particular, as disclosed in U.S. Pat. No. 5,066,883 and Japanese Patent Laid-Open Nos. 2-257551 and 4-28137 filed by the present applicant, an image display apparatus using the combination of a surface-conduction type electron-emitting device and a fluorescent substance which emits light upon reception of electrons has been studied. An image display apparatus using the combination of a surface-conduction type electron-emitting device and a fluorescent substance is expected to have improved characteristics over other conventional image display apparatuses. For example, in comparison with recent popular liquid crystal display apparatuses, the above display apparatus is superior in that it does not require a backlight, because it is of a self-emission type apparatus, and it has a wide viewing angle.

A method of driving a plurality of FE type electron-emitting devices arranged side-by-side is disclosed in, e.g., U.S. Pat. No. 4,904,895 filed by the present applicant. A known example of an application of FE type electron-emitting devices to an image display apparatus is a flat display apparatus reported by R. Meyer et al. [R. Meyer: "Recent Development on Microtips Display at LETI", Tech. Digest of 4th Int. Vacuum Microelectronics Conf., Nagahama, pp. 6–9 (1991)].

An example of an application of a larger number of MIM type electron-emitting devices arranged side-by-side to an image display apparatus is disclosed in Japanese Patent Laid-Open No. 3-55738 filed by the present applicant.

The present inventors have examined cold cathode devices using various materials, methods, and structures in addition to those described above. The present inventors have further studied a multi-electron-source formed by laying out many cold cathode devices, and an image display apparatus using this multi-electron-source.

The present inventors have devised a multi-electron-source using an electrical wiring method shown in, e.g., FIG. 25. That is, the multi-electron-source is formed by two-dimensionally laying out many cold cathode devices in a matrix, as shown in FIG. 25.

Referring to FIG. 25, reference numerals 4001 denote cold cathode devices; numerals 4002 denote row-direction wirings; and numerals 4003 denote column-direction wirings. In practice, the row- and column-direction wirings 4002 and 4003 have finite electrical resistances, which are indicated by resistors 4004 and 4005 in FIG. 25 of the wires. This wiring method is called a simple matrix wiring method. FIG. 25 shows a 6×6 matrix for the sake of illustrative convenience, but the matrix scale is not limited to this. For example, in a multi-electron-source for an image display apparatus, devices necessary for desired image display are laid out and wired.

In the multi-electron-source formed by laying out cold cathode devices in a simple matrix, proper electrical signals are applied to the row- and column-direction wirings 4002 and 4003 in order to output desired electrons. For example, to drive cold cathode devices on an arbitrary row within the matrix, a selection voltage Vs is applied to row-direction wiring 4002 on the selected row, while a non-selection voltage Vns is applied to row-direction wirings 4002 on unselected rows. In synchronism with this, a driving voltage Ve for outputting electrons is applied to the column-direction wirings 4003. According to this method, if a voltage drop caused by the resistors 4004 and 4005 is ignored, a voltage (Ve-Vs) is applied to cold cathode devices on a selected row, and a voltage (Ve-Vns) is applied to cold cathode devices on unselected rows. If the voltages Ve, Vs, and Vns are set to proper magnitude values, electrons would be output at a desired strength from only cold cathode devices on the selected row. If different driving voltages Ve are applied to respective column-direction wirings, electrons would be output at different strengths from respective devices on the selected row. If the application time of the driving voltage Ve is changed, the electron output time would be changed. A voltage (Ve-Vs) to be applied to a selected device will be referred to as Vf. According to another method of obtaining electrons from the multi-electron-source having a simple matrix layout, the multi-electron-source is driven by connecting a current source for supplying a current necessary for outputting desired electrons, instead of a voltage source for applying the driving voltage Ve to the column-direction wiring. The current flowing through the current source will be referred to as a device current If, and the amount of emitted electrons will be referred to as an emission current Ie.

The multi-electron-source formed by laying out cold cathode devices in a simple matrix can be variously applied and suitably used as an electron source for an image display apparatus by properly applying an electrical signal corresponding to, e.g., image information.

In U.S. Pat. No. 5,734,361, driving of electron-emitting devices laid out in a matrix is described. Particularly, correction of the driving signal is also described.

SUMMARY OF THE INVENTION

It is an object of the present invention to provide an image display apparatus having a new structure, and a method of driving the same.

The image display apparatus according to the present invention has the following arrangement.

The image display apparatus comprises an image display member having a plurality of light-emitting portions, first means for causing the light-emitting portions to emit light in accordance with an input image signal, and adjustment means for differentially adjusting the light emitting brightness of the plurality of light-emitting portions at different positions of the image display member, when the input image signal designates the same brightness for the plurality of light-emitting portions.

The adjustment means may adjust an operation of the first means or adjust a signal input to the first means.

The first means may be an electron-emitting device for emitting electrons in accordance with a signal input from the adjustment means. In this case, the adjustment means may adjust the number of electrons which are emitted from the electron-emitting device within a predetermined time to reach the light-emitting portions. The number of electrons emitted within the predetermined time to reach the plurality of light-emitting portions is adjusted by adjusting the number of electrons emitted by the electron-emitting device within a unit time, adjusting the time to emit electrons by the electron-emitting device within the predetermined time, or adjusting the shape of an electron beam irradiating the plurality of light-emitting portions.

The present invention is particularly effective when the first means includes a plurality of first means corresponding to the plurality of light-emitting portions.

Adjustment for differentially adjusting light emission brightness in accordance with the different positions of the plurality of light-emitting portions includes adjustment to set a light-emitting portion near the center of an image display area at a higher brightness than a brightness of at least one light-emitting portion near a periphery. In particular, the adjustment may include adjustment to set a brightness of a light-emitting portion near the center of an image display area higher than a brightness of a light-emitting portion near a periphery, and to decrease the brightness in a horizontal or vertical direction or radially toward the periphery. This adjustment can effectively make a portion near the center bright even if the brightness of an image is decreased.

The plurality of light-emitting portions are preferably arranged substantially linearly. A degree of adjustment is desirably determined depending on positions, on a line, of the plurality of light-emitting portions arranged substantially linearly. Determination of a degree of adjustment also includes determination of whether adjustment is performed. The plurality of light-emitting portions may include a plurality of groups of light-emitting portions arranged substantially linearly.

The image display apparatus may further comprise detection means for detecting a brightness level of an input image signal. A degree of adjustment (including determination of whether adjustment is performed) may be determined in accordance with a brightness level of the input image signal. The brightness level of an input image signal may be detected based on the brightness levels of a series of image signals, particularly on the brightness levels of image signals corresponding to one line or one frame. The average brightness level of a plurality of image signals may be detected and used.

The image display apparatus may further comprise means for determining input image signal. A degree of adjustment may be determined in ce with the type of the input image signal.

The image display apparatus may further comprise means for selecting a degree of adjustment to allow the user to select the degree.

A plurality of degrees of adjustment may be prepared as patterns to allow the user to select them.

The present invention incorporates a method of driving the image display apparatus characterized by performing the above-described adjustment.

The present invention also incorporates a television comprising the above image display apparatus and an image signal input unit.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described in detail below with reference to the accompanying drawings.

First Embodiment

Figure 1:
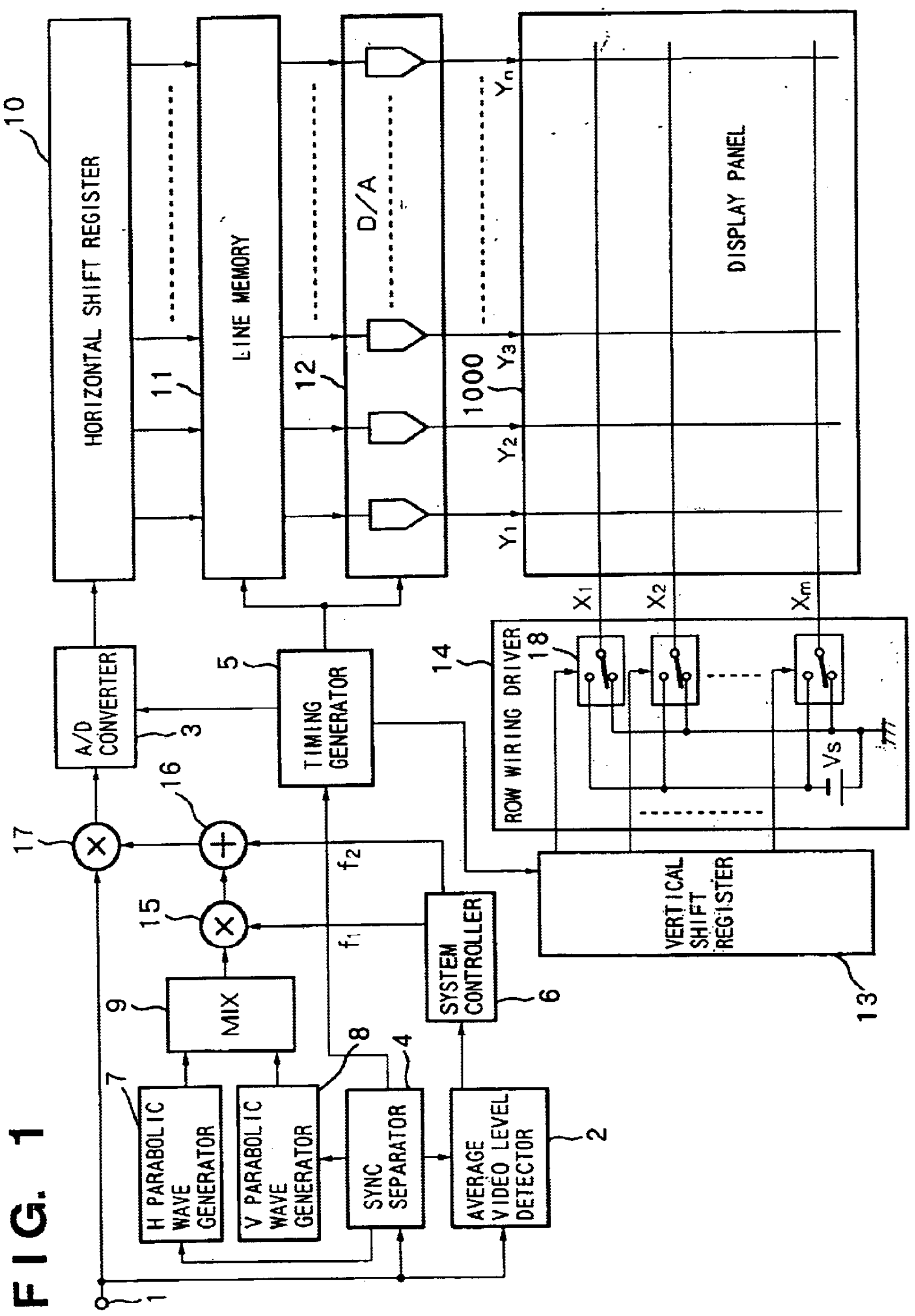
FIG. 1 is a block diagram showing the arrangement of an image display apparatus according to the first embodiment of the present invention.

FIG. 1 is a block diagram showing the arrangement of an image display apparatus according to the first embodiment of the present invention.

Referring to FIG. 1, reference numeral 1000 denotes a display panel constituted by laying out surface-conduction type electron-emitting devices (to be described in detail later) according to the first embodiment in a matrix by row and column wirings. Electrons emitted by these electron-emitting devices are accelerated from a high-voltage power supply (not shown) toward fluorescent substances so as to collide against the fluorescent substances and excite them, thereby emitting light. A video signal input through a video signal input terminal 1 is sent to an average video level detector 2 and a sync separator 4. The sync separator 4 extracts sync signals superposed on the video signal and outputs them to a timing generator 5, the average video level detector 2, an H parabolic wave generator 7, and a V parabolic wave generator 8. The H parabolic wave generator 7 receives a horizontal sync signal from the sync separator 4 and generates a parabolic wave in a horizontal period which synchronizes with the horizontal sync signal. The V parabolic wave generator 8 receives a vertical sync signal from the sync separator 4 and generates a parabolic wave in a vertical period which synchronizes with the vertical sync signal. The H and V parabolic waves from the H and V parabolic wave generators 7 and 8 are superposed on each other by a mixer 9. A system controller 6 is composed of a microcomputer, memory, A/D converter, D/A converter, and the like. The system controller 6 receives an average video level output from the average video level detector 2, determines the average video level, and then controls the amplitude and offset amount of the H/V-superposed parabolic wave output from the mixer 9.

Letting p(t) be the parabolic wave superposed by the mixer 9, and f1 and f2 be the amplitude control coefficient and offset amount output from the system controller 6, a correction amount F by amplitude modulation is given by $$\text{Correction Amount } F = f1 \times p(t) + f2 \quad (1)$$

The correction amount F is calculated by a multiplier 15 and an adder 16.

The video signal input through the video signal input terminal 1 is multiplied by a multiplier 17 by the H/V-superposed parabolic wave whose amplitude and offset are controlled by the average video level. As a result, the amplitude of the video signal is modulated to generate a brightness difference between the central portion of the display area and its peripheral portion on the display panel 1000.

The parabolically modulated video signal is converted into a continuous digital data sequence by an A/D converter 3. The digital data sequence is input to and serial/parallel-converted by a horizontal shift register 10. Video signals corresponding to one line are held by the shift register 10 and then latched by a one-line memory 11. The synchronized data equal in number to the column wirings of the display panel 1000 are converted into, e.g., PWM-modulated pulse voltage signals. The resultant signals are applied to respective column wirings. A vertical shift register 13 sequentially selects one wiring row in one horizontal period, and supplies a selection signal for selecting all rows in the vertical period to a row wiring driver 14. The row wiring driver 14 has switch circuits 18 corresponding in number to row wirings. The row wiring driver 14 applies a voltage (−Vs) to a row wiring selected in accordance with an output from the vertical shift register 13, and grounds unselected row wirings.

Figure 3:
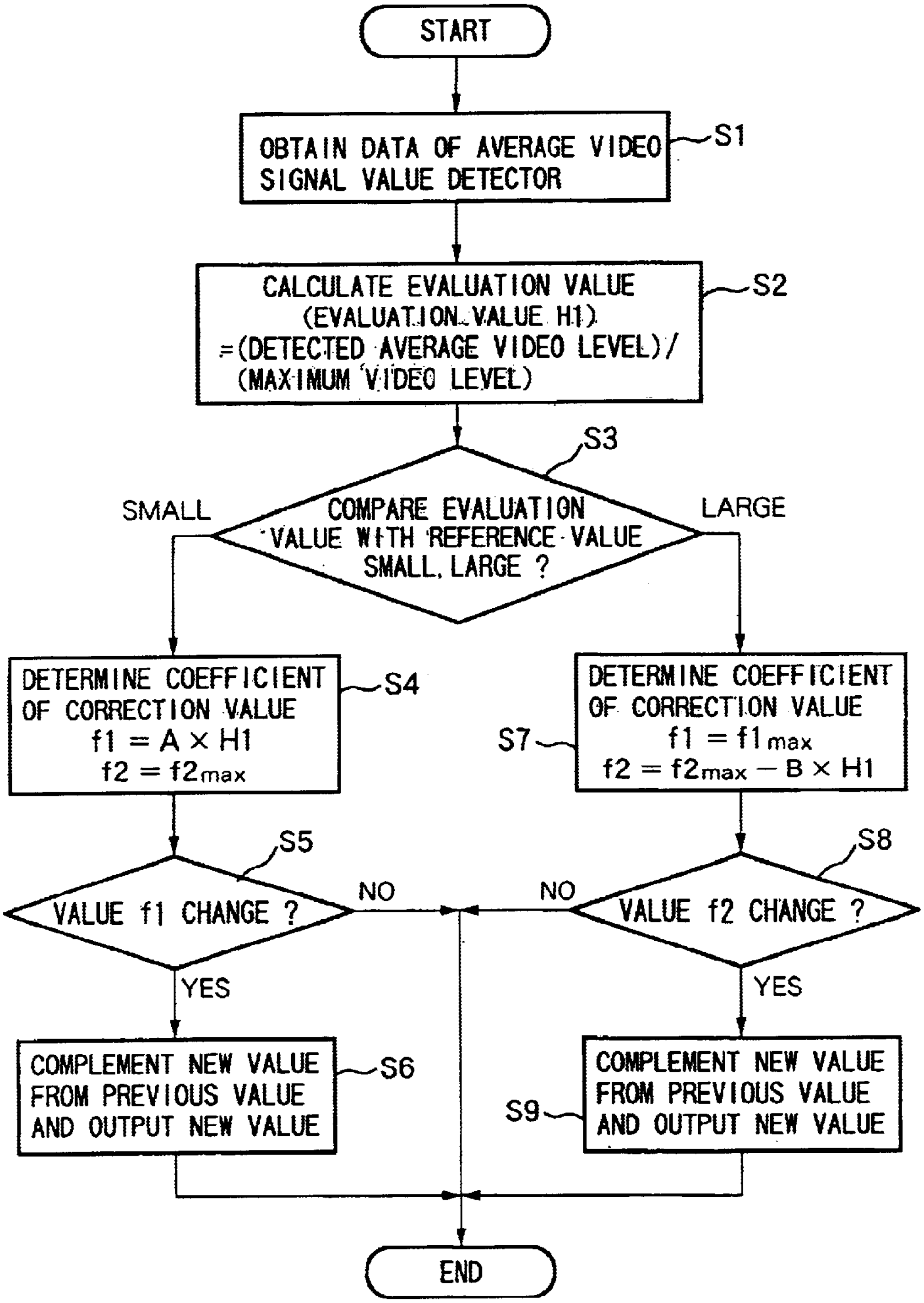
FIG. 3 is a flow chart showing control by the system controller in the first embodiment.

The system controller 6 performs, e.g., processing shown in the flow chart of FIG. 3. That is, when the average video level detected by the average video level detector 2 is lower than a given reference level, the system controller 6 determines that the average brightness need not be suppressed because the average brightness of the display panel 1000 is low even if the video signal is directly output. Therefore, the system controller 6 performs control so as to give a brightness distribution in which the center of the display area becomes brighter than the peripheral portion without changing the average brightness of the display area. In this case, the system controller 6 makes the offset level of the superposed parabolic wave uniform and changes the amplitude at the average video level. The amplitude of the video signal is controlled at the average video level in order to compensate for a decrease in brightness at the center of the display panel 1000 caused by variations in voltage drop amount in the wirings upon changes in video level.

When the average video level of the video signal is higher than the reference level, the system controller 6 decreases the offset level in order to suppress the average brightness level of the entire display area, thereby unifying the brightness level of the entire display area at the reference value. At this time, since the average brightness level does not change, the amplitude is controlled at a constant value without any change. This processing will be described in detail with reference to the flow chart in FIG. 3.

Figure 2:
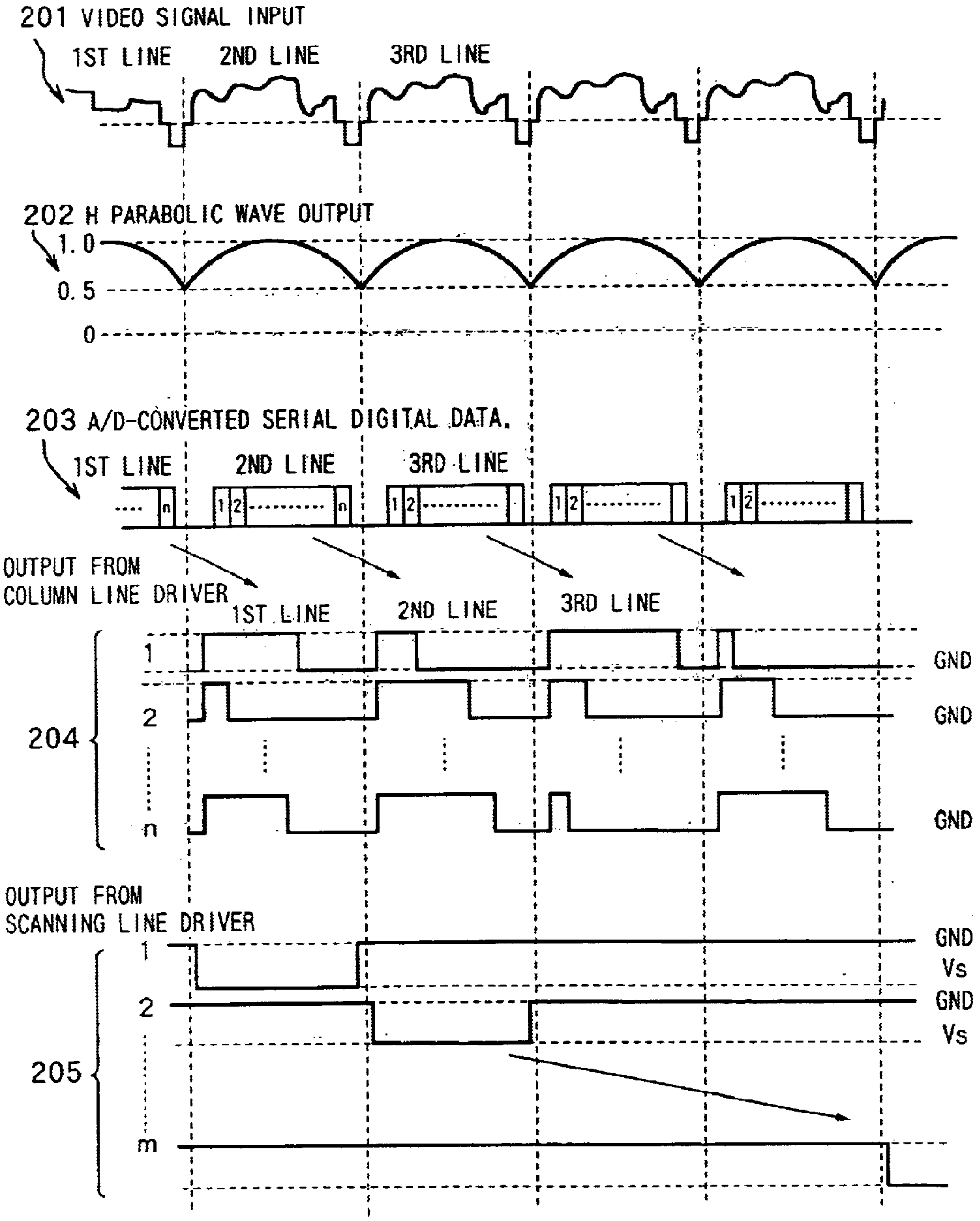
FIG. 2 is a timing chart for explaining the timings of output signals from respective units in FIG. 1.

FIG. 2 is a timing chart showing operation of the image display apparatus in FIG. 1.

Referring to FIG. 2, reference numeral 201 denotes a video signal input through the video signal input terminal 1; and numeral 202 denotes an H parabolic wave output from the H parabolic wave generator 7 in synchronism with a horizontal sync signal included in the video signal. This H parabolic wave is set to exhibit the highest output level at almost the center of the period of the horizontal sync signal. Reference numeral 203 denotes digital video data for each line which is converted into a digital signal by the A/D converter 3; numeral 204 denotes a signal PWM-modulated in accordance with the value (multilevel) of parallel video data upon converting the line data into the parallel video data; and numeral 205 denotes a scanning signal for driving the row wirings of the display panel 1000. A selected row wiring receives a voltage (−Vs), whereas an unselected row is set to the ground level.

Processing in the system controller 6 of the image display apparatus according to the first embodiment will be explained with reference to the flow chart of FIG. 3.

In step S1, the average level of the video signal is input from the average video level detector 2. The flow advances to step S2 to divide the input average video level by the maximum video level, thereby obtaining an evaluation value (H1). In step S3, the evaluation value (H1) is compared with a reference value. If the evaluation value is smaller than the reference value, the flow shifts to step S4 to determine the correction coefficients f1 and f2 of equation (1) for obtaining the correction amount. The correction amount is obtained from $f1 = A \times H1$ (A is the weighting constant) and $f2 = f2max$ (the maximum value of f2). After these coefficients are determined, the flow advances to step S5 to check whether the value f1 has changed. If YES in step S5, the flow shifts to step S6 to determine a value for complementing previous and current values. Based on the determined correction coefficients, the correction amount is calculated by the multiplier 15 and adder 16.

In step S3, if the evaluation value (H1) is larger than the reference value, the flow proceeds to step S7—to determine the correction coefficients f1 and f2 of equation (1) for obtaining the correction amount. The correction amount is obtained from $f1 = f1max$ (the maximum value of f1) and $f2 = f2max - B \times H1$ (B is the weighting constant). After these coefficients are determined, the flow advances to step S8 to check whether the value 12 has changed. If YES in step S8, the flow proceeds to step S9 to determine a value for complementing previous and current values. Based on the determined correction coefficients, the correction amount is calculated by the multiplier 15 and adder 16. Note that in step S5 or S8, when the value f1 or f2 has not changed, the determined correction coefficient f1 or f2 is directly used to calculate the correction amount F.

The correction amount F output from the adder 16 is multiplied by the input video signal, and the product is used as corrected display data to drive the column wiring of the display panel 1000.

Figure 4:
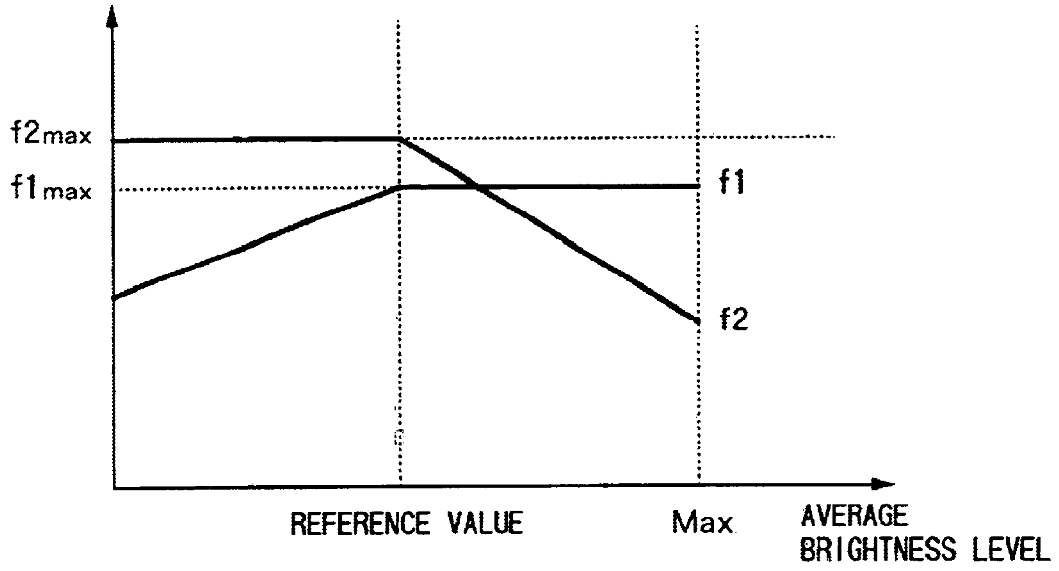
FIG. 4 is a graph for explaining changes in correction coefficient in the first embodiment.

FIG. 4 is a graph for explaining changes in correction coefficients f1 and f2 along with comparison with the reference value in step S3 described above.

Figure 5:
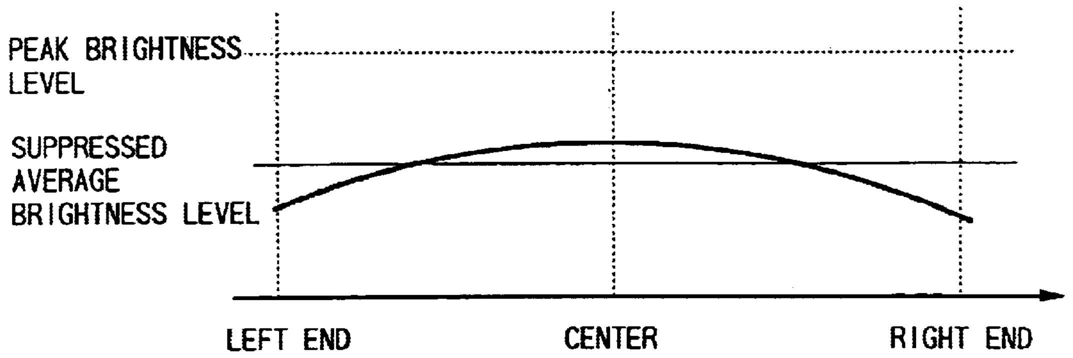
FIG. 5 is a graph for explaining the brightness distribution in the display area in the first embodiment.

FIG. 5 is a graph for explaining the brightness distribution on the display panel 1000 according to the first embodiment.

As shown in FIG. 5, the brightness level at the central portion of the display area is set higher than the brightness level at the peripheral portion so as to attain a brightness distribution in which the central portion of the display area is brighter than the peripheral portion, and to suppress the brightness using the average brightness. As a result, the center of the display area on the display panel 1000 can be made bright under simple control, and a decrease in brightness at the center caused by the resistance of the wire can be prevented.

The user often wants to desirably change the correction amount of the brightness distribution, in which the center of the screen in the display area is bright, in accordance with the kind of image signal to be received or a preference of the user of the image display apparatus.

In this case, an input signal determination unit and user interface means (neither is shown) are provided, and a system controller 6*a* controls the correction coefficients f1 and f2 in accordance with the determination result of an input signal or a users demand.

Second Embodiment

Figure 6:
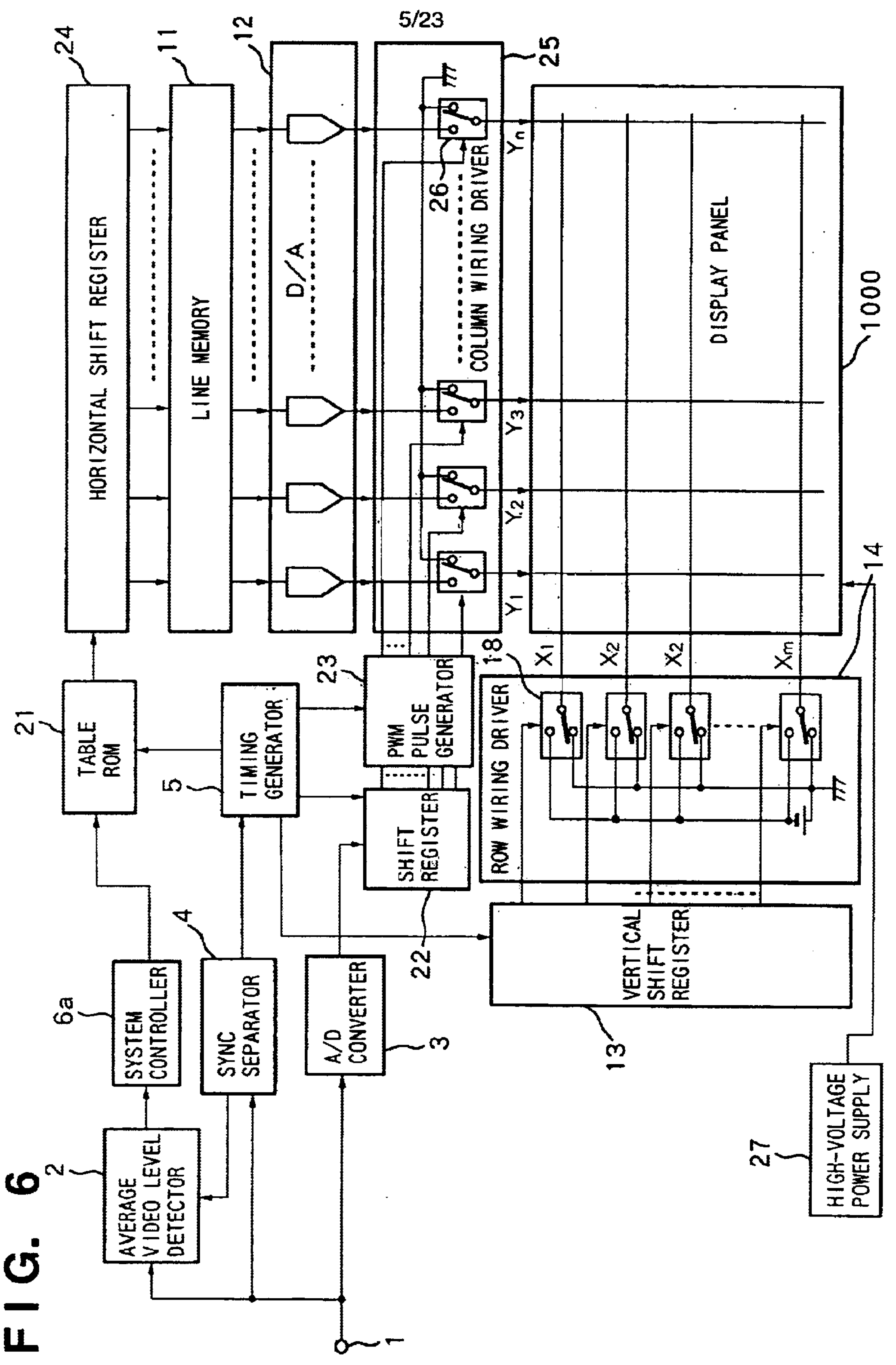
FIG. 6 is a block diagram showing the arrangement of an image display apparatus according to the second embodiment of the present invention.

FIG. 6 is a block diagram showing the arrangement of an image display apparatus according to the second embodiment of the present invention. The same reference numerals as in FIG. 1 denote the same parts, and a description thereof will be omitted.

A video signal input through a video signal input terminal 1 is sent to an average video level detector 2 and a sync separator 4. The sync separator 4 extracts sync signals superposed on the video signal and outputs them to a timing generator 5 and the average video level detector 2.

A column wiring driver 25 comprises switch circuits 26 for determining a voltage or current bias applied from a D/A converter 12 to each column wiring, and is selected or grounded in accordance with a pulse output from a PWM pulse generator 23 arranged for each column wiring. A shift register 22 receives serial data obtained by converting a video signal input through the video signal input terminal 1 into a continuous digital data sequence by an A/D converter 3. The shift register 22 converts the serial data into parallel data and outputs the parallel data to the PWM pulse generator 23. The PWM pulse generator 23 PWM-modulates synchronized data equal in number to column wirings that are latched by a one-line memory (not shown). Then, the PWM pulse generator 23 outputs the resultant data.

Brightness distribution pattern data for giving a brightness distribution in accordance with a position in the display area is written in one bank of a table ROM 21 in advance. A plurality of types of brightness distribution patterns are prepared for each bank. A system controller 6*a* receives an average video level signal from the average video level detector 2 to determine the average video level. Then, the system controller 6*a* switches a read bank of the table ROM 21, and outputs brightness pattern data corresponding to the average video level to a horizontal shift register 24. Data stored in the table ROM 21 is read out in synchronism with a timing signal from the timing generator 5. The readout data is sent to and serial/parallel-converted by the horizontal shift register 24. The parallel data is sent to a one-line memory 11, and the one-line memory 11 latches a brightness pattern corresponding to one line. The D/A converter 12 receives, from the one-line memory 11, synchronized brightness distribution pattern data equal in number to column wirings, and outputs a corresponding voltage or current bias. The D/A converter 12 reads out data of the table ROM 21 stored in the one-line memory 11 at the same timing as video data (PWM-modulated signal) from the PWM pulse generator 23, and outputs the data to the column wiring driver 25.

A vertical shift register 13 sequentially selects respective rows of a display panel 1000 in units of periods of a horizontal sync signal, and supplies to a row wiring driver 14 a selection signal for scanning all the rows of the display panel 1000 in the period of a vertical sync signal. The row wiring driver 14 applies a voltage (−Vs) to a selected row wiring, and grounds an unselected row wiring. Reference numeral 27 denotes a high-voltage power supply used to apply an acceleration voltage between the fluorescent substances of the display panel 1000 and the electron source substrate.

Figure 7:
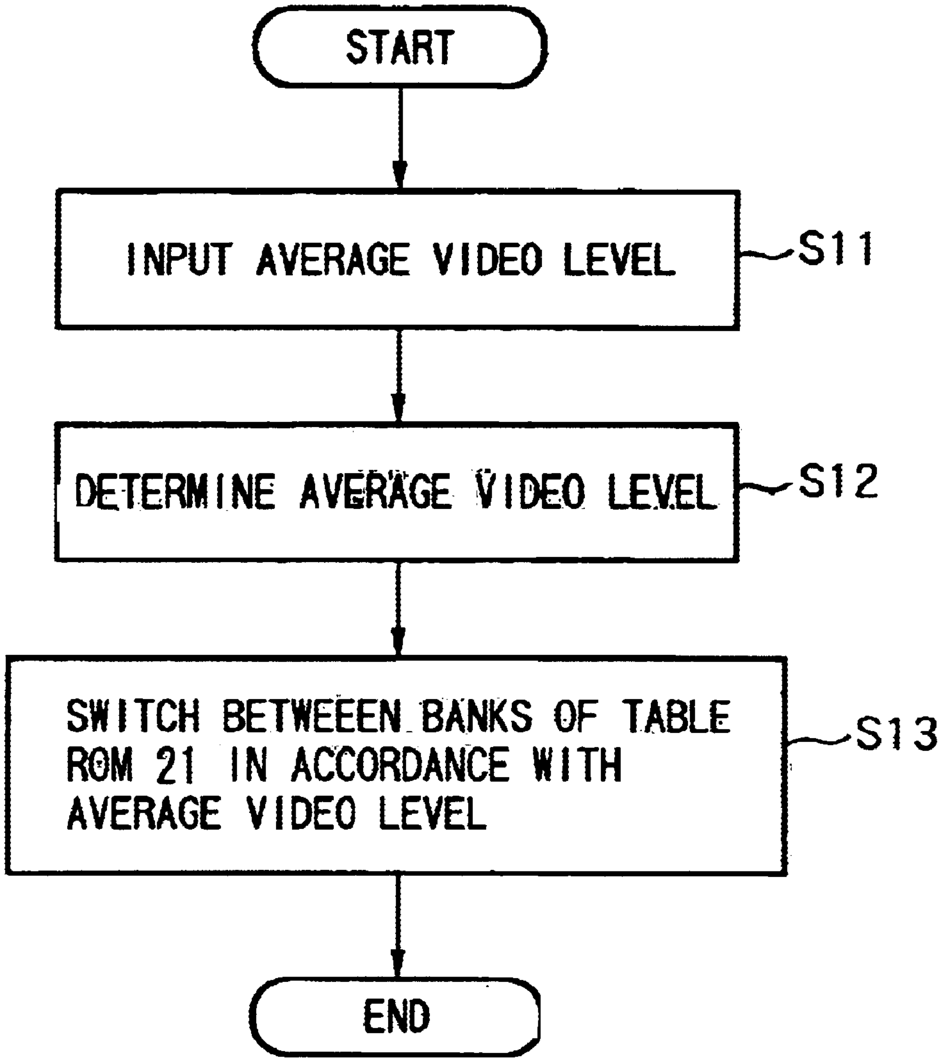
FIG. 7 is a flow chart showing control by a system controller in the second embodiment.

FIG. 7 is a flow chart showing processing in the system controller 6*a* according to the second embodiment.

An average video level detected by the average video level detector 2 is input in step S11, and the average video level is determined in step S12. The flow advances to step S13 to switch between banks of the table ROM 21 in accordance with the determined average video level. Accordingly, brightness distribution pattern data corresponding to the average brightness level is output to the horizontal shift register 24. Similar to the first embodiment, a decrease in brightness at the central position of the display panel can be prevented.

In an image apparatus capable of displaying a plurality of different types of video signals, such as a TV signal and a computer signal, a brightness distribution corresponding to each input signal is desirably supplied.

For, e.g., a TV signal, important information is often present at the center of the display, and the brightness at this position is preferably high. For a computer signal, important information rarely depends on the position, and the brightness of the display is preferably uniform.

In this case, brightness distribution pattern data for giving a preferable brightness distribution corresponding to a position in the display area in displaying a TV signal and brightness distribution pattern data for giving a preferable brightness distribution corresponding to a position in the display area in displaying a PC signal, are prepared in the memory banks of the table ROM 21 in advance. An input signal determination unit (not shown) is provided, and the system controller 6*a* switches between banks of the table ROM 21 in accordance with the determination result of an input signal.

A preferable pattern of a brightness distribution corresponding to a position may be differentiated depending on the user of the image display apparatus. In this case, brightness distribution pattern data for giving brightness distributions corresponding to various positions are prepared in the table ROM 21 in advance. The system controller 6*a* switches between banks of the table ROM 21 upon reception of a user request through a user interface means (not shown).

Third Embodiment

Figure 9:
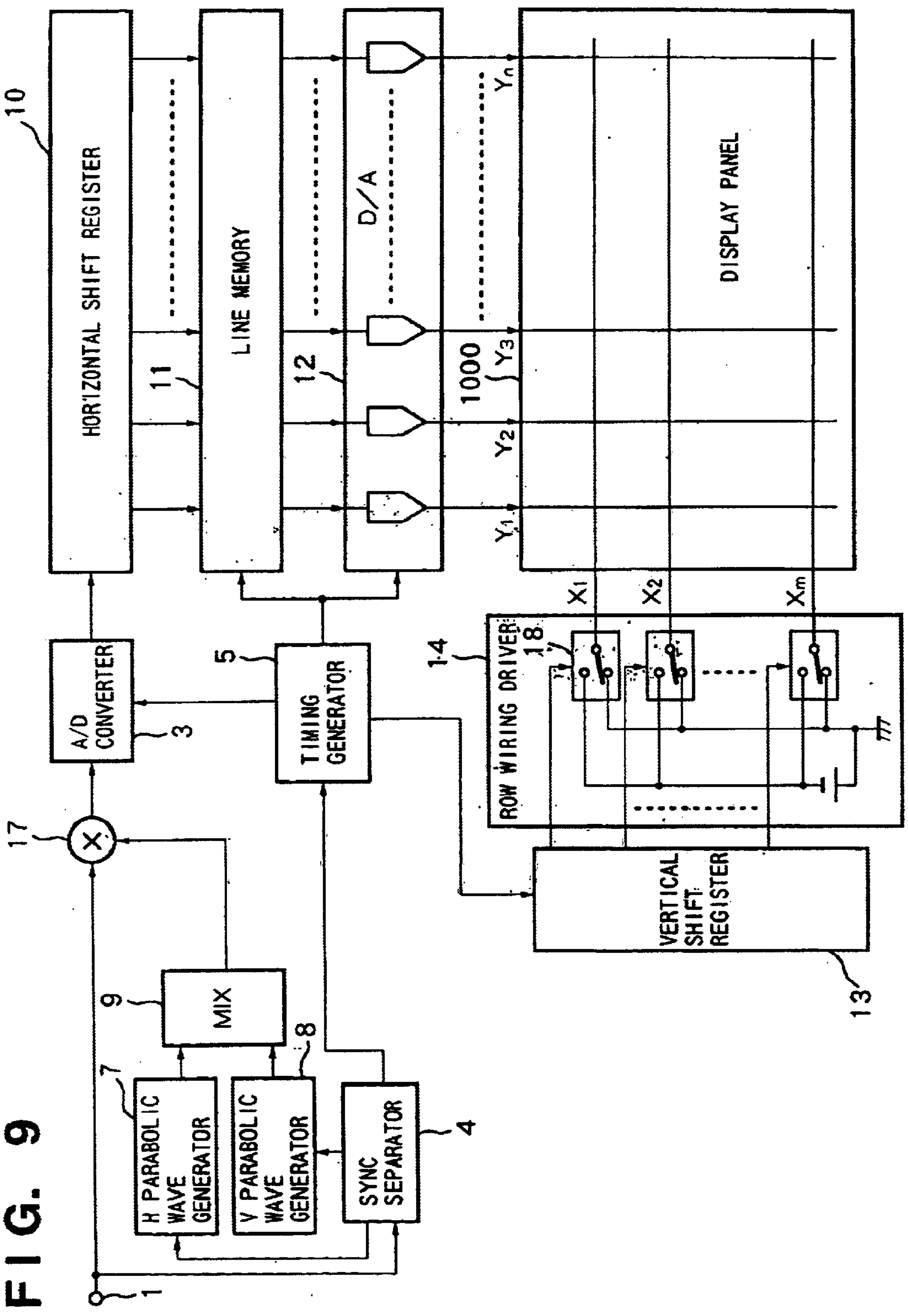
FIG. 9 is a block diagram showing the arrangement of an image display apparatus according to the fourth embodiment of the present invention.

FIG. 9 is a block diagram showing the arrangement of an image display apparatus according to the third embodiment of the present invention. The same reference numerals as in FIG. 1 denote the same parts.

A video signal input through a video signal input terminal 1 is sent to a sync separator 4. The sync separator 4 extracts sync signals superposed on the video signal and outputs them to a timing generator 5, an H parabolic wave generator 7, and a V parabolic wave generator 8. The H parabolic wave generator 7 receives a horizontal sync signal from the sync separator 4 and generates a parabolic wave in a horizontal period which synchronizes with the horizontal sync signal. The V parabolic wave generator 8 receives a vertical sync signal from the sync separator 4 and generates a parabolic wave in a vertical period which synchronizes with the vertical sync signal. The H and V parabolic waves are superposed on each other by a mixer 9.

The video signal through the video signal input terminal 1 is multiplied by a multiplier 17 by the H/V-superposed parabolic wave. As a result, the amplitude of the video signal is modulated to generate a brightness difference between the center and peripheral portion of the display area on a display panel 1000.

The parabolically modulated video signal is converted into a continuous digital data sequence by an A/D converter 3. The digital data sequence is sent to and serial/parallel-converted by a horizontal shift register 10. The parallel data is latched by a one-line memory 11. The synchronized data equal in number to column wirings are converted into, e.g., PWM-modulated pulse voltage biases. The obtained biases are applied to the respective column wirings of the display panel 1000. A vertical shift register 13 sequentially selects one row in one horizontal period of the horizontal sync signal, and supplies a selection signal for selecting all rows in the vertical period to a row wiring driver 14. The row wiring driver 14 applies a voltage (−Vs) to a selected row wiring and grounds unselected row wirings.

In this way, the brightness at the peripheral portion of the display area on the display panel 1000 can be set lower than at the center so as to reduce the power consumption of the overall apparatus. A decrease in brightness at the peripheral portion of the display area can reduce the sum of device selection currents flowing through the wirings. This can also reduce the amount of generated voltage drops so as to increase the brightness at the center of the display area.

Fourth Embodiment

Figure 8:
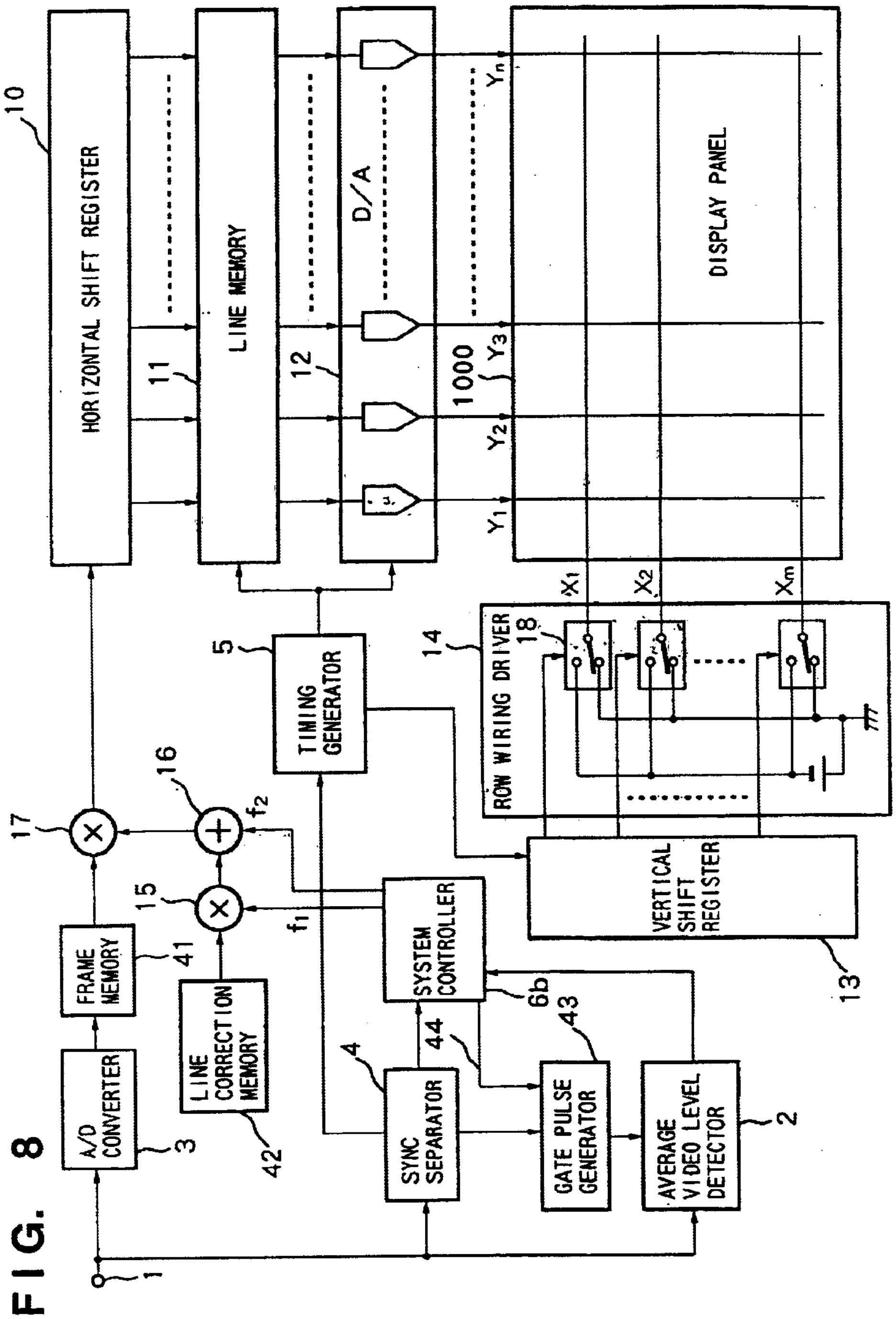
FIG. 8 is a block diagram showing the arrangement of an image display apparatus according to the third embodiment of the present invention.

FIG. 8 is a block diagram showing the arrangement of an image display apparatus according to the fourth embodiment of the present invention. The same reference numerals as in FIG. 1 denote the same parts.

A video signal input through a video signal input terminal 1 is sent to an average video level detector 2, an A/D converter 3, and a sync separator 4. The input video signal is converted into a continuous digital data sequence by the A/D converter 3. The digital data sequence is delayed by one frame period in a frame memory 41. The sync separator 4 extracts sync signals superposed on the video signal and transmits them to a timing generator 5 and a gate pulse generator 43.

In accordance with a control signal 44 from a system controller 6*b*, the gate pulse generator 43 supplies to the average video level detector 2 a gate pulse for dividing the display area of a display panel 1000 into a plurality of small areas. While the gate pulse is input, the average video level detector 2 integrates a video signal input through the input terminal 1. In other words, the average video level detector 2 detects the average video level in units of small display areas (video signals corresponding to one or a plurality of scanning lines) of the display panel 1000, and outputs the detected average video level to the system controller 6*b*. For example, if the gate pulse generator 43 generates a gate pulse in one horizontal period, the average video level detector 2 can detect the average video level of each scanning line. The system controller 6*b* can add the detected values of respective scanning lines to obtain the average video level of one frame. Data for giving a horizontal brightness distribution like the one shown in FIG. 5 is stored in a line correction memory 42. Assume that data which makes the center of the display area of the display panel 1000 brighter than right and left peripheral portions is stored in the line correction memory 42. Data of the line correction memory 42 is read out at the same timing as the frame memory 41. An output from the line correction memory 42 is multiplied by a multiplier 15 by a proper coefficient corresponding to the average video level of each scanning line or each frame that is detected by the system controller 6*b*. The product is added and corrected by an adder 16, and the resultant data is multiplied by the multiplier 17 by video data from the frame memory 41.

Letting p(t) be an output from the line correction memory 42, and f1 and f2 be the amplitude control coefficient and offset amount output from the system controller 6*b*, the correction amount F determined based on a correction coefficient obtained from the system controller 6*b* is given by $$F=f1\times p(t)+f2$$

The amplitude control coefficient f1 is determined in each horizontal period on the basis of the-average video level detection value of one line and information representing an ordinal line number in the display area. For example, the amplitude control coefficient f1 is set large for a high average level, and large for a position closer to the center of the display area of the display panel 1000. The offset amount f2 is determined by the average level detection value of one frame and controls the average brightness level of the overall display area of the display panel 1000.

The fourth embodiment exemplifies the case wherein the average video level detector 2 detects the average video detection level in one horizontal period. Alternatively, a plurality of horizontal lines can be processed as one unit area by changing a gate pulse output from the gate pulse generator 43 on the basis of an instruction from the system controller 6*b*, and them unit area can be further horizontally divided.

Under control based on the average video level of each small area prepared by dividing the display area, the brightness can be more finely controlled. Any influence of differentiation in brightness due to voltage drops caused by the resistance of the column and row wirings can be diminished.

Note that processing of the system controller 6*b* in this case is the same as processing in the flow chart of FIG. 3 except for the following. That is, before processing in step S1, the control signal 44 is output to the gate pulse generator 43 to designate the period of the gate pulse. In step S1, an input average brightness level is determined to correspond to each display area. The correction coefficients f1 and f2 are output in a period corresponding to the display area.

Figure 10:
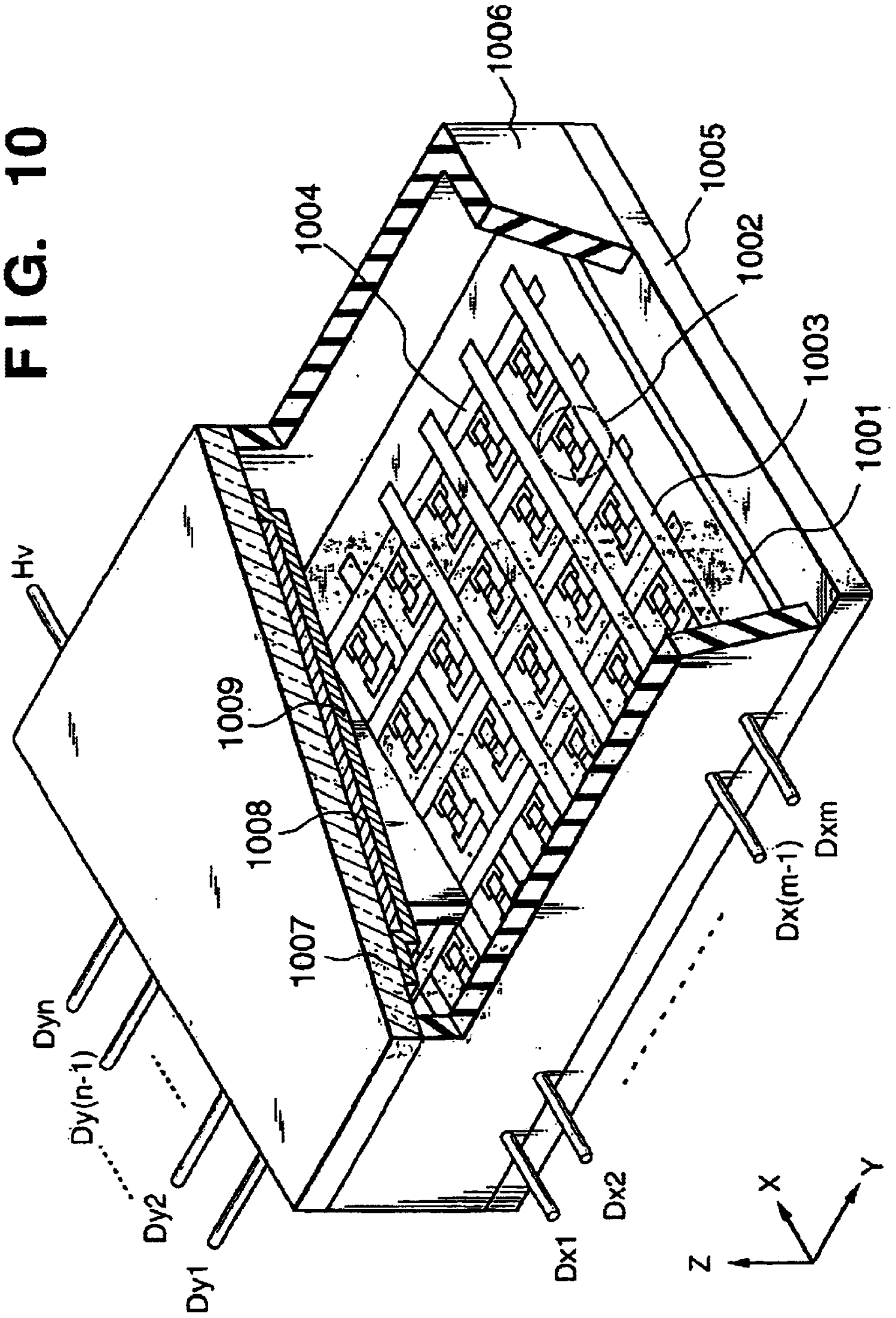
FIG. 10 is a partially cutaway perspective view showing the display panel of the image display apparatus according to the present embodiment.

Method and Application of Surface-Conduction Type Electron-Emitting Device According to Embodiment FIG. 10 is a partially cutaway perspective view of the outer appearance of a display panel 1000 according to this embodiment, showing the internal structure of the display panel 1000.

In FIG. 10, reference numeral 1005 denotes a rear plate; numeral 1006 denotes a side wall; and numeral 1007 denotes a face plate. These parts 1005 to 1007 constitute an airtight container for maintaining the inside of the display panel under vacuum. To construct the airtight container, it is necessary to seal-connect the respective parts to obtain sufficient strength and maintain airtight condition. For example, frit glass is applied to junction portions, and sintered at 400 to 500° C. in air or nitrogen atmosphere, thus the parts are seal-connected. A method for exhausting (evacuating) air from the inside of the container will be described later.

The rear plate 1005 has a substrate 1001 fixed thereon, on which n×m cold cathode devices 1002 are formed (n, m=positive integer equal to 2 or more, properly set in accordance with a desired number of display pixels. For example, in a display apparatus for high-resolution television display, preferably n=3,000 or more, m=100 or more. In this embodiment, n=3,072, m=1,024). The n×m surface-conduction type electron-emitting devices are arranged in a simple matrix with m row-direction wirings 1003 and n column-direction wirings 1004. The portion constituted by the components 1001 to 1004 will be referred to as a multi-electron-source. The manufacturing method and structure of the multi-electron-source will be described in detail below.

In this embodiment, the substrate 1001 of the multi-electron-source is fixed to the rear plate 1005 of the airtight container. If, however, the substrate 1001 of the multi-electron-source has sufficient strength, the substrate 1001 of the multi-electron-source may also serve as the rear plate of the airtight container.

Figure 11A:
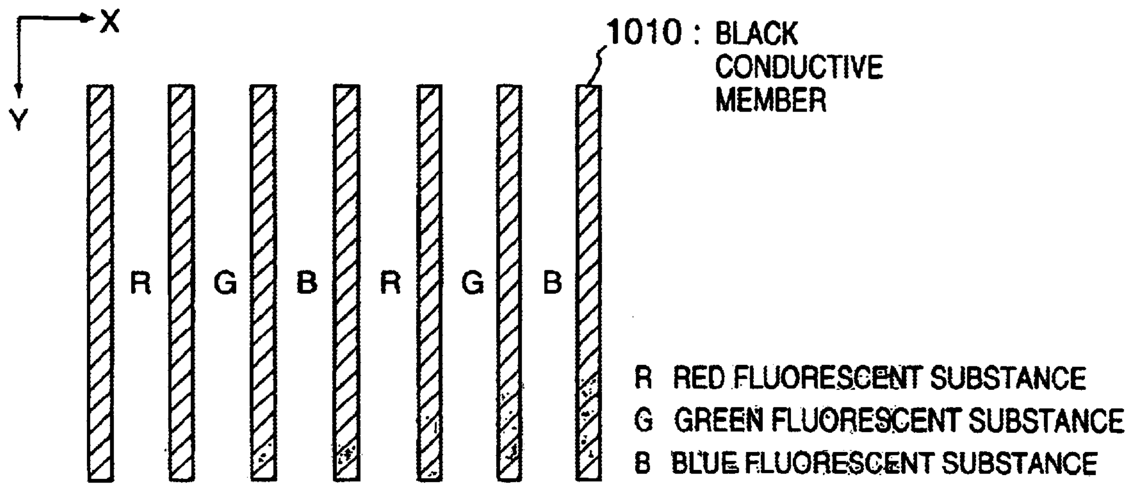
FIGS. 11A and 11B are plan views showing examples of the alignment of fluorescent substances on the face plate of the display panel according to the present embodiment.

A fluorescent film 1008 is formed on the lower surface of the face plate 1007. As the display panel 1000 of this embodiment is a color display apparatus, the fluorescent film 1008 is coated with red (R), green (G), and blue (B) fluorescent substances, i.e., three primary color fluorescent substances. As shown in FIG. 11A, the respective color fluorescent substances are formed into a striped structure, and black conductive members 1010 are provided between the stripes of the respective color fluorescent substances. The purpose of providing the black conductive members 1010 is to prevent display color misregistration even if the electron irradiation position is shifted to some extent, to prevent degradation of display contrast by shutting off reflection of external light, to prevent charge-up of the fluorescent film by electrons, and the like. As a material for the black conductive members 1010, graphite is used as a main component, but other materials may be used so long as the above purpose is attained.

Figure 11B:
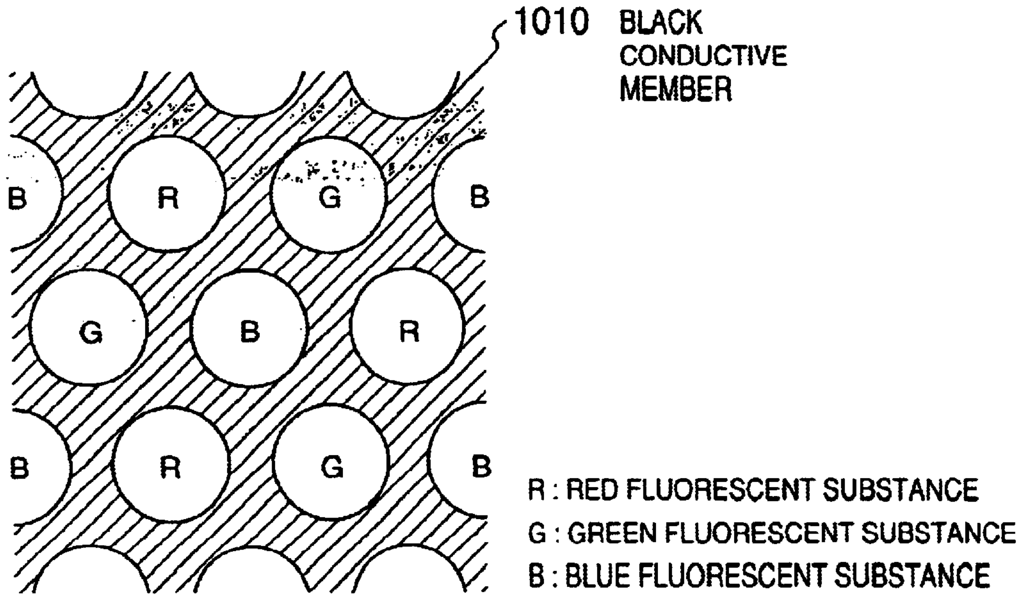

Further, three-primary colors of the fluorescent film is not limited to the stripes as shown in FIG. 11A. For example, a delta arrangement as shown in FIG. 11B or any other arrangement may be employed. Note that when a monochrome display panel is formed, a single-color fluorescent substance may be applied to the fluorescent film 1008, and the black conductive member may be omitted.

Furthermore, a metal back 1009, which is well-known in the CRT field, is provided on the fluorescent film 1008 on the rear plate side. The purpose of providing the metal back 1009 is to improve the light-utilization ratio by mirror-reflecting part of the light emitted by the fluorescent film 1008, to protect the fluorescent film 1008 from collision with negative ions, to be used as an electrode for applying an electron accelerating voltage, to be used as a conductive path for electrons which excited the fluorescent film 1008, and the like. The metal back 1009 is formed by forming the fluorescent film 1008 on the face plate 1007, smoothing the front surface of the fluorescent film, and depositing aluminum thereon by vacuum deposition. Note that when fluorescent substances for a low voltage are used for the fluorescent film 1008, the metal back 1009 is not used.

Furthermore, for application of an accelerating voltage or improvement of the conductivity of the fluorescent film, transparent electrodes made of, e.g., ITO may be provided between the face plate 1007 and the fluorescent film 1008, although such electrodes are not used in this embodiment.

Symbols Dxl to Dxm, Dyl to Dyn and Hv denote electric connection terminals for airtight structure provided for electrical connection of the display panel 1000 with an electric circuit (not shown). The terminals Dx1 to Dxm are electrically connected to the row-direction wiring 1003 of the multi-electron-source Dyl to Dyn, to the column-direction wiring 1004 of the multi-electron-source; and Hv, to the metal back 1009 of the face plate.

To exhaust (evacuate) air from the inside of the airtight container and make the interior a vacuum, after forming the airtight container, an exhaust pipe and a vacuum pump (neither is shown) are connected, and air is evacuated from the airtight container to obtain a vacuum pressure at about $10_{-7}$ Torr. Thereafter, the exhaust pipe is sealed. To maintain the vacuum condition inside of the airtight container, a getter film (not shown) is formed at a predetermined position in the airtight container immediately before/after the sealing. The getter film is a film formed by heating and evaporating getter material mainly including, e.g., Ba, by heating or high-frequency heating. The suction-attaching operation of the getter film maintains the vacuum condition in the container at $1\times10^{-5}$ or $1\times10^{-7}$ Torr.

The basic structure and manufacturing method of the display panel 1000 according to the present embodiment of the invention have been described.

Next, the manufacturing method of the multi-electron-source used in the display panel 1000 according to the present embodiment of the invention will be described. As the multi-electron-source used in the image display apparatus of the embodiment is obtained by arranging surface-conduction type electron emitting devices in a simple matrix, the material, shape, and manufacturing method of the surface-conduction type electron-emitting device are not limited. The present inventors have also found that among the surface-conduction type electron-emitting devices, an electron source where an electron-emitting portion or its peripheral portion comprises a fine particle film is excellent in electron-emitting characteristic and further, it can be easily manufactured. Accordingly, this type of electron source is the most appropriate electron source to be employed in a multi-electron-source of a bright large-screen image display apparatus. On the display panel of the present embodiment, surface-conduction type electron-emitting devices each having an electron-emitting portion or peripheral portion formed from a fine particle film are employed. The basic structure, manufacturing method and characteristic of the preferred surface-conduction type electron-emitting device will be described first, and then the structure of the multi-electron-source having simple-matrix wired devices will be described later.

(Preferred Structure and Manufacturing Method of Surface-Conduction Type Electron-Emitting Device)

Typical examples of surface-conduction type electron-emitting devices each having an electron-emitting portion or its peripheral portion made of a fine particle film include two types of devices, namely flat and step type devices.

(Flat Surface-Conduction Type Electron-Emitting Device)

Figure 12A:
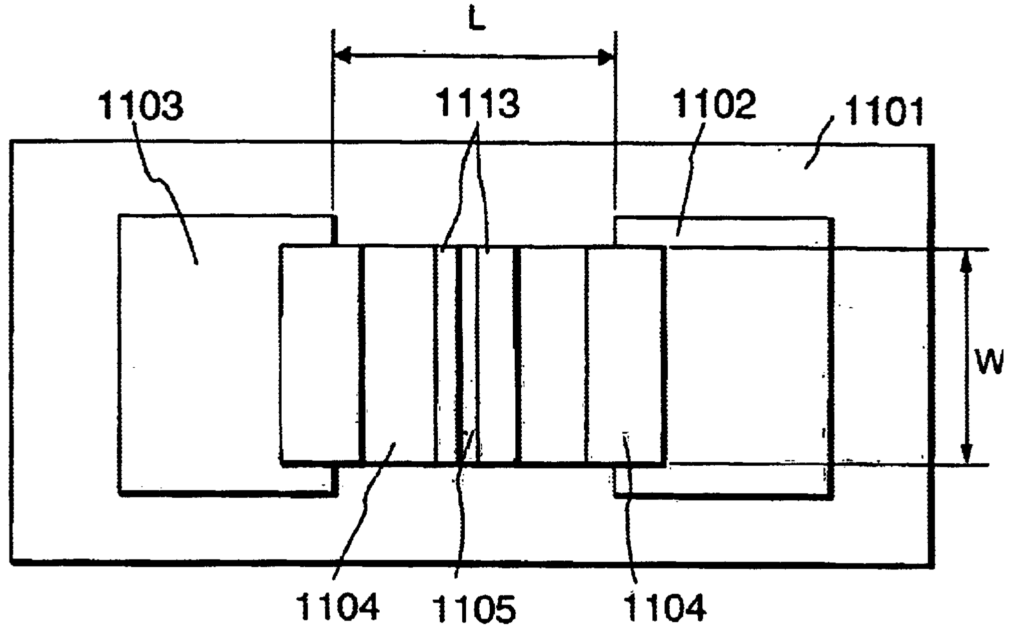
FIGS. 12A and 12B are a plan view and a sectional view, respectively, showing a flat surface-conduction type electron-emitting device used in the present embodiment.
Figure 12B:
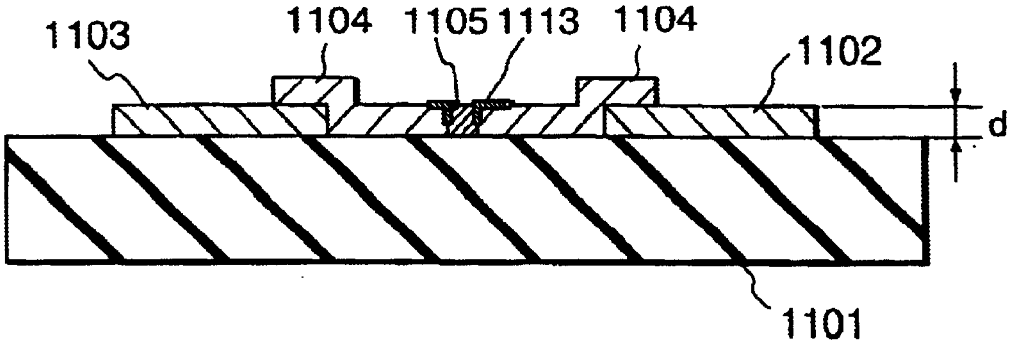

First, the structure and manufacturing method of a flat surface-conduction type electron-emitting device will be described. FIGS. 12A and 12B are a plan view and a sectional view, respectively, for explaining the structure of the flat surface-conduction type electron-emitting device. Referring to FIGS. 12A and 12B, reference numeral 1101 denotes a substrate; numerals 1102 and 1103 denote device electrodes; numeral 104 denotes a conductive thin film, numeral 1105 denotes an electron-emitting portion formed by the forming processing; and numeral 1113 denotes a thin film formed by the activation processing.

As the substrate 1101, various glass substrates of, e.g., quartz glass and soda-lime glass, various ceramic substrates of, e.g., alumina, or any of those substrates with an insulating layer formed thereon can be employed.

The device electrodes 1102 and 1103, provided in parallel with the substrate 1101 and opposing each other, comprise conductive material. For example, any material of metals such as Ni, Cr, Au, Mo, W, Pt, Ti, Cu, Pd and Ag, or alloys of these metals, metal oxides, such as $In_2O_3$—$SnO_2$, or semiconductive material such as polysilicon, can be employed. These electrodes can be easily formed by the combination of a film-forming technique, technique such as vacuum-evaporation, and a patterning technique, such as photolithography or etching; however, any other method (e.g., printing technique) may be employed.

The shape of the device electrodes 1102 and 1103 is appropriately designed in accordance with an application object of the electron-emitting device. Generally, an interval L between electrodes is designed by selecting an appropriate value in a range from hundreds of angstroms to hundreds of micrometers. The most preferable range for a display apparatus is from several micrometers to tens of micrometers. As for the electrode thickness d, an appropriate value is selected in a range of from hundreds of angstroms to several micrometers.

The conductive thin film 1104 comprises a fine particle film. The "fine particle film" is a film which contains a lot of fine particles (including masses of particles) as film-constituting members. In microscopic view, normally individual particles exist in the film at predetermined intervals, or adjacent to each other, or overlapped with each other.

One particle has a diameter within a range of from several angstroms to thousands of angstroms. Preferably, the diameter is within a range of from 10 angstroms to 200 angstroms. The thickness of the fine particle film is appropriately set in consideration of conditions as follows. That is, a condition necessary for electrical connection to the device electrode 1102 or 1103, a condition for the forming processing to be described later, a condition for setting electric resistance of the fine particle film itself to an appropriate value to be described later, etc. Specifically, the thickness of the fine particle film is set in a range of from several angstroms to thousands of angstroms, and more preferably, 10 angstroms to 500 angstroms.

Materials used for forming the fine particle film are, e.g., metals such as Pd, Pt, Ru, Ag, Au, Ti, In, Cu, Cr, Fe, Zn, Sn, Ta, W and Pb, oxides such as PdO, $SnO_2$, $In_2O_3$, PbO and $Sb_2O_3$, borides such as $HfB_2$, $ZrB_2$, $LaB_6$, $CeB_6$, $YB_4$ and $GdB_4$, carbides such as TiC, ZrC, HfC, TaC, SiC, and WC, nitrides such as TiN, ZrN and HfN, semiconductors such as Si and Ge, and carbons. Any appropriate material(s) may be appropriately selected.

As described above, the conductive thin film 1104 is formed with a fine particle film, and the sheet resistance of the film is set to reside within a range of from $10^3$ to $10^7$ (Ω/sq).

As it is preferable that the conductive thin film 1104 is electrically connected to the device electrodes 1102 and 1103, they are arranged so as to overlap with each other at one portion. In FIG. 12B, the respective parts are overlapped in order of, the substrate, the device electrodes, and the conductive thin film from the bottom. This overlapping order may be, the substrate, the conductive thin film, and the device electrodes from the bottom.

The electron-emitting portion 1105 is a fissured portion formed at a part of the conductive thin film 1104. The electron-emitting portion 1105 has a resistance characteristic higher than peripheral conductive thin film. The fissure is formed by the forming processing to be described later on the conductive thin film 1104. In some cases, particles, having a diameter of several angstroms to hundreds of angstroms, are arranged within the fissured portion. As it is difficult to exactly illustrate actual position and shape of the electron-emitting portion, therefore, FIGS. 12A and 12B show the fissured portion schematically.

The thin film 1113, which comprises carbon or a carbon compound material, covers the electron-emitting portion 1115 and its peripheral portion. The thin film 1113 is formed by the activation processing, processing to be described later, later after the forming processing.

The thin film 1113 is preferably graphite monocrystalline, graphite polycrystalline, amorphous carbon, or a mixture thereof, and its thickness is 500 angstroms or less, more preferably, 300 angstroms or less. As it is difficult to exactly illustrate actual position or shape of the thin film 1113, FIGS. 12A and 12B show the film schematically. FIG. 12A shows the device where a part of the thin film 1113 is removed.

The preferred basic structure of the surface-conduction type electron-emitting device is as described above. In the present embodiment, the device has the following constituents. That is, the substrate 1101 comprises a soda-lime glass, and the device electrodes 1102 and 1103, are a Ni thin film. The electrode thickness d is 1000 angstroms and the electrode interval L is 2 $\mu$m.

The main material of the fine particle film is Pd or PdO. The thickness of the fine particle film is about 100 angstroms, and its width W is 100 $\mu$m.

Next, a method of manufacturing a preferred flat surface-conduction type electron-emitting device will be described with reference to FIGS. 13A to 13D, which are sectional views showing the manufacturing processes of the surface-conduction type electron-emitting device. Note that reference numerals are the same as those in FIGS. 12A and 12B.

Figure 13A:
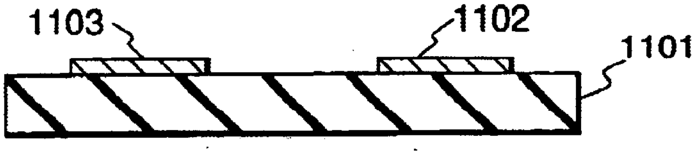
FIGS. 13A to 13E are sectional views showing the steps in manufacturing the flat surface-conduction type electron-emitting device according to the present embodiment.

(1) First, as shown in FIG. 13A, the device electrodes 1102 and 1103 are formed on the substrate 1101. In forming these electrodes, first, the substrate 1101 is fully washed with a detergent, pure water and an organic solvent, then, material of the device electrodes is deposited there (as a depositing method, a vacuum film-forming technique such as evaporation and sputtering may be used). Thereafter, patterning using a photolithography etching technique is performed on the deposited electrode material. Thus, the pair of device electrodes (1102 and 1103) shown in FIG. 13A are formed.

Figure 13B:
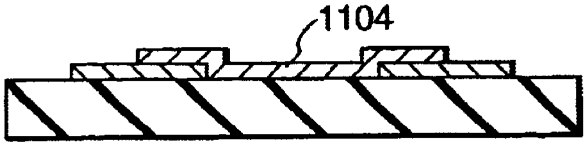

(2) Next, as shown in FIG. 13B, the conductive thin film 1104 is formed. In forming the conductive thin film 1104, first, an organic metal solvent is applied to the substrate in FIG. 13A, then the applied solvent is dried and sintered, thus forming a fine particle film. Thereafter, the fine particle film is patterned into a predetermined shape by the photolithography etching method. The organic metal solvent means a solvent of organic metal compound containing material of minute particles, used for forming the conductive thin film (in this embodiment, i.e., Pd is used as a main component. In the present embodiment, application of organic metal solvent is made by dipping, however, any other method, such as a spinning method or spraying method may be employed).

As a film-forming method of the conductive thin film made with the fine particle film, the application of organic metal solvent used in the present embodiment can be replaced with any other method, such as a vacuum evaporation method, a sputtering method or a chemical vapor-phase accumulation method.

Figure 13C:
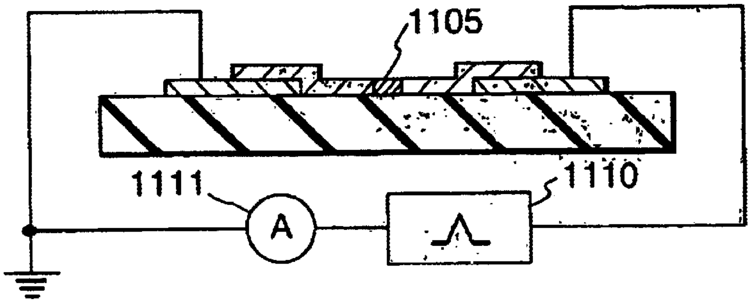

(3) Then, as shown in FIG. 13C, appropriate voltage is applied between the device electrodes 1.102 and 1103 from a power source 1110 for the forming processing, then the forming processing is performed, thus forming the electron-emitting portion 1105.

The forming processing here is electric energization of a conductive thin film 1104 formed of a fine particle film so as to appropriately destroy, deform, or deteriorate a part of the conductive thin film, thus changing the film so as to have a structure suitable for electron emission. In the conductive thin film formed of a fine particle film, the portion changed for electron emission (i.e., electron-emitting portion 1105) has an appropriate fissure in the thin film. Comparing the thin film 1104 having the electron-emitting portion 1105 with the thin film before the forming processing, the electric resistance measured between the device electrodes 1102 and 1103 has greatly increased.

Figure 14:
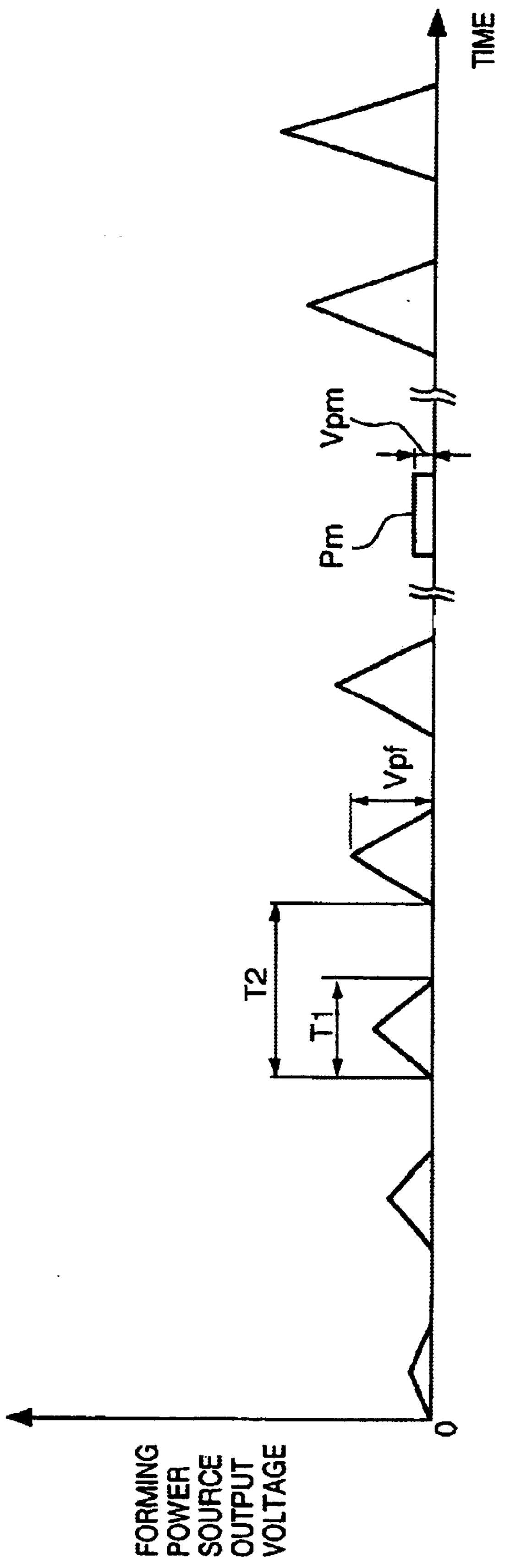
FIG. 14 is a graph showing the waveform of an application voltage in forming processing.

The electrification method will be explained in more detail with reference to FIG. 14, which shows an example of a waveform of appropriate voltage applied from the forming power source 1110. Preferably, in the case of forming a conductive thin film of a fine particle film, a pulse-form voltage is employed. In this embodiment, as shown in FIG. 14, a triangular-wave pulse having a pulse width T1 is continuously applied at pulse an interval of T2. Upon application, a wave peak value Vpf of the triangular-wave pulse is sequentially increased. Further, a monitor pulse Pm, used to monitor a status of forming of the electron-emitting portion 1105, is inserted between the triangular-wave pulses at appropriate intervals, and current that flows at the insertion is measured by a galvanometer 1111 (see FIG. 13C).

In this embodiment, in $10^{-5}$ Torr vacuum atmosphere, the pulse width T1 is set to 1 msec; and the pulse interval T2 is set, to 10 msec. The wave peak value Vpf is increased by 0.1 V, at each pulse. Each time the triangular-wave has been applied for five pulses, the monitor pulse Pm is inserted. To avoid ill-effecting the forming processing, a voltage Vpm of the monitor pulse is set to 0.1 V. When the electric resistance between the device electrodes 1102 and 1103 becomes $1\times10^{6}$ Ω, i.e., the current measured by the galvanometer 1111 upon application of monitor pulse becomes $1\times10^{-7}$ A or less, the electrification of the forming processing is terminated.

Note that the above processing method is preferable to the surface-conduction type electron-emitting device of this embodiment. In the case of changing the design of the surface-conduction type electron-emitting device concerning, e.g., the material or thickness of the fine particle film, or the device electrode interval L, the conditions for electrification are preferably changed in accordance with the change of device design.

Figure 13D:
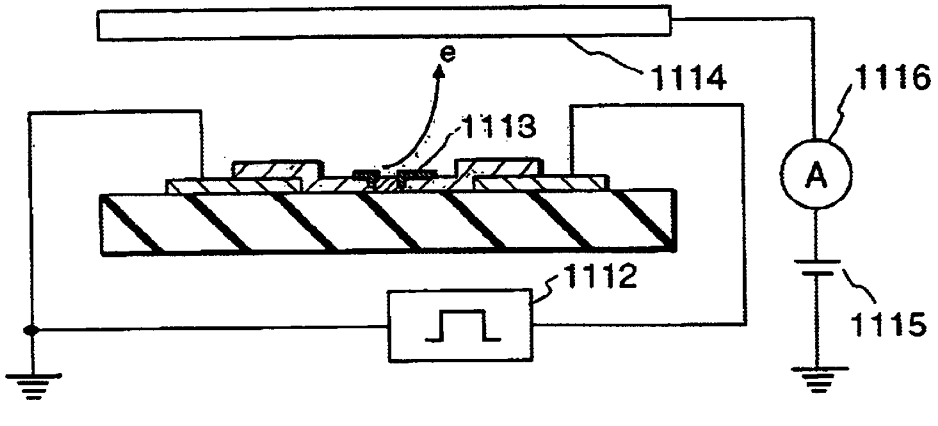

(4) Next, as shown in FIG. 13D, appropriate voltage is applied, from an activation power source 1112, between the device electrodes 1102 and 1103, and the activation processing is performed to improve electron-emitting characteristic. The activation processing here is electrification of the electron-emitting portion 1105 formed by the forming processing on appropriate condition(s), for depositing carbon or carbon compound around the electron-emitting portion 1105 (In FIG. 13D, the deposited material of carbon or carbon compound is shown as material 1113). Comparing the electron-emitting portion 1105 with that before the activation processing, the emission current at the same applied voltage has become, typically, 100 times or greater.

The activation is made by periodically applying a voltage pulse in $10^{-4}$ or $10^{-}5$ Torr vacuum atmosphere, to accumulate carbon or carbon compound mainly deprived from organic compound(s) existing in the vacuum atmosphere. The accumulated material 1113 may be any one of graphite monocrystalline, graphite polycrystalline, amorphous carbon or a mixture thereof. The thickness of the accumulated material 1113 is 500 angstroms or less, and more preferably, 300 angstroms or less.

Figure 15A:
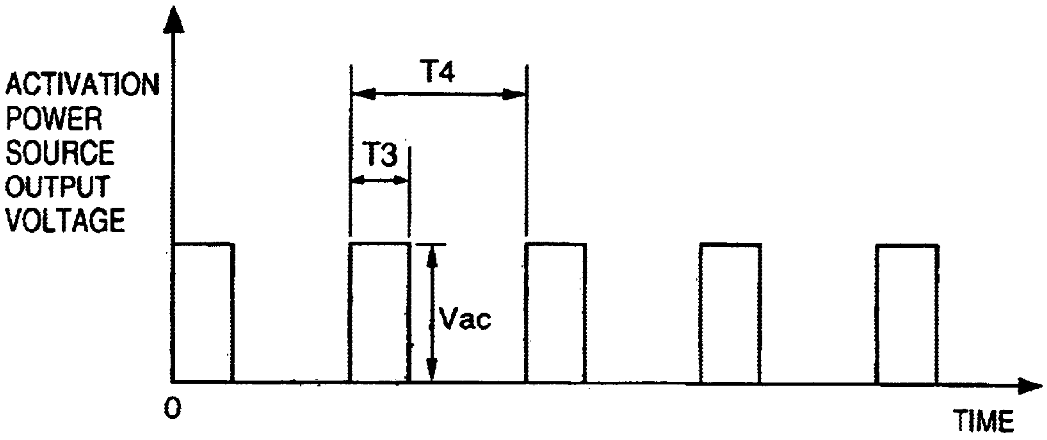
FIGS. 15A and 15B are graphs respectively showing the waveform of an application voltage in activation processing, and a change in emission current Ie in the activation processing.

The electrification method will be described in more detail with reference to FIG. 15A, which shows an example of a waveform of appropriate voltage applied from the activation power source 1112. In this embodiment, a constant-voltage rectangular wave is periodically applied so as to perform the activation processing. More specifically, a rectangular-wave voltage Vac is set to 14 V; a pulse width T3 is set to 1 msec; and a pulse interval T4 is set to 10 msec. Note that the above electrification conditions are preferable for the surface-conduction type electron-emitting device of the present embodiment. In a case where the design of the surface-conduction type electron-emitting device is changed, the electrification conditions are preferably changed in accordance with the change of device design.

Figure 15B:
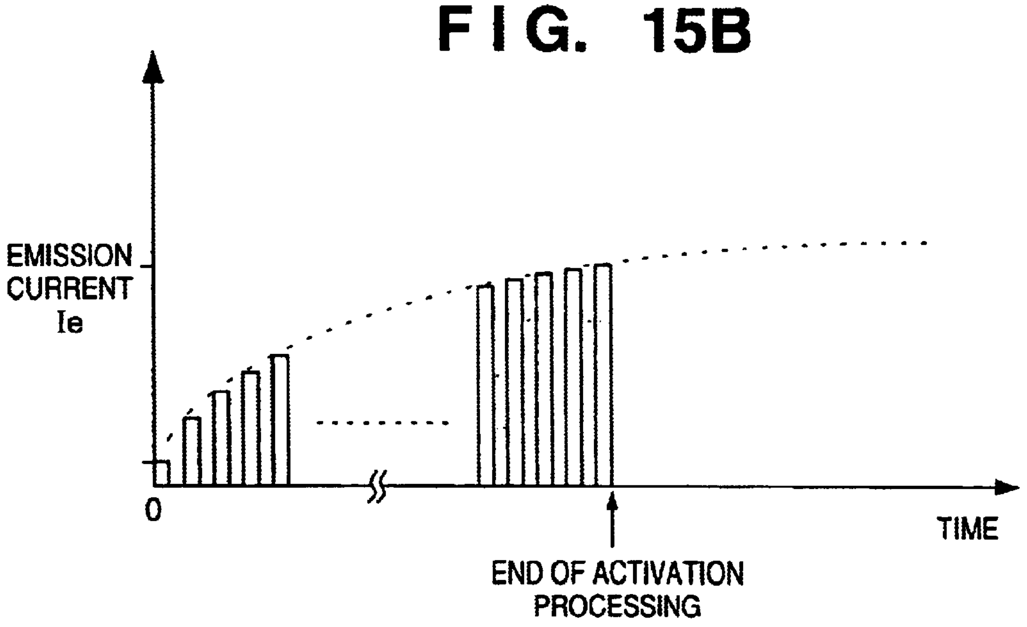

In FIG. 13D, reference numeral 1114 denotes an anode electrode, connected to a direct-current (DC) high-voltage power source 1115 and a galvanometer 1116, for capturing emission current Ie emitted from the surface-conduction type electron-emitting device (in a case where the substrate 1101 is incorporated into the display panel before the activation processing, the fluorescent surface of the display panel is used as the anode electrode 1114). While applying voltage from the activation power source 11112, the galvanometer 1116 measures the emission current Ie, and thus monitors the progress of activation processing, so as to control operation of the activation power source 1112. FIG. 15B shows an example of the emission current Ie measured by the galvanometer 1116. As application of pulse voltage from the activation power source 1112 is started in this manner, the emission current Ie increases with elapse of time, gradually comes into saturation, and then barely increases thereafter. At the substantial saturation point, the voltage application from the activation power source 1112 is stopped, and then the activation processing is terminated.

Note that the above electrification conditions are preferable to the surface-conduction type electron-emitting device of the present embodiment. In the case of changing the design of the surface-conduction type electron-emitting device, the conditions are preferably changed in accordance with the change of device design.

Figure 13E:
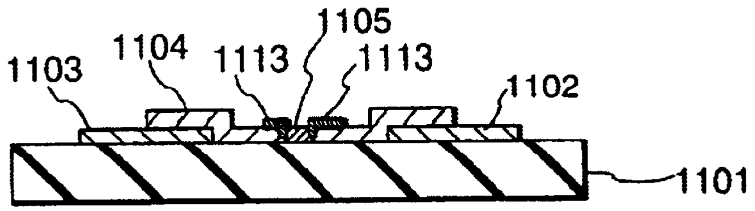

The flat surface-conduction type electron-emitting device shown in FIG. 13E is manufactured as described above.

(Step Surface-Conduction Type Electron-Emitting Device)

Next, another typical structure of the surface-conduction type electron-emitting device, where an electron-emitting portion or its peripheral portion is formed of a fine particle film, i.e., a step surface-conduction type electron-emitting device, will be described.

Figure 16:
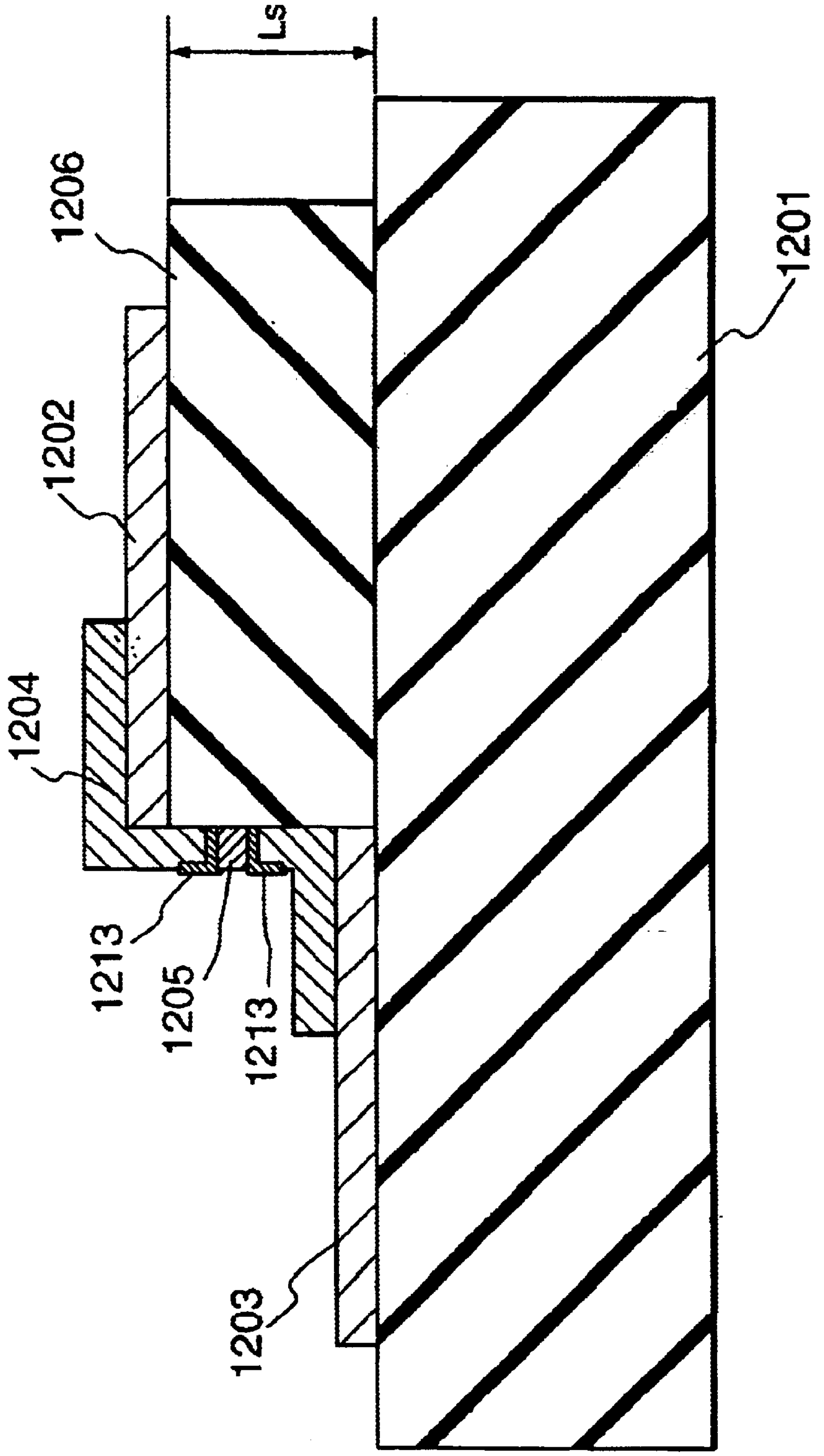
FIG. 16 is a sectional view showing a step surface-conduction type electron-emitting device used in the present embodiment.

FIG. 16 is a sectional view schematically showing the basic construction of the step surface-conduction type electron-emitting device according to this embodiment. Referring to FIG. 16, reference numeral 1201 denotes a substrate; numerals 1202 and 1203 denote device electrodes; numeral 1206 denotes a step-forming member for making a height difference between the electrodes 1202 and 1203; numeral 1204 denotes a conductive thin film using a fine particle film; numeral 1205 denotes an electron-emitting portion formed by the forming processing; and numeral 1213 denotes a thin film formed by the activation processing.

A difference between the step surface-conduction type electron-emitting device and the flat one described above is that one of the device electrodes (1202 in this example) is provided on the step-forming member 1206, and the conductive thin film 1204 covers the side surface of the step-forming member 1206. The device interval L in FIGS. 12A and 12B is set in this structure as a height difference Ls corresponding to the height of the step-forming member 1206. Note that the substrate 1201, the device electrodes 1202 and 1203, and the conductive thin film 1014 using the fine particle film can comprise the materials given in the explanation of the flat surface-conduction type electron-emitting device. Further, the step-forming member 1206 comprises electrically insulating material such as $SiO_2$.

Next, a method of manufacturing the step-surface-conduction type electron-emitting device will be described with reference to FIGS. 17A to 17F, which are sectional views showing the manufacturing processes. In these figures, reference numerals of the respective parts are the same as those in FIG. 16.

Figure 17A:
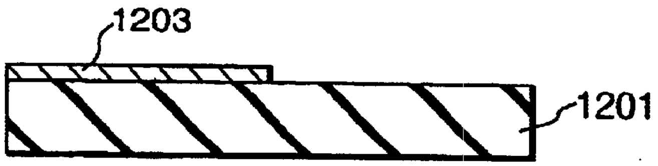
FIGS. 17A to 17F are sectional views showing the steps in manufacturing the step surface-conduction type electron-emitting device.

(1) First, as shown in FIG. 17A, the device electrode 1203 is formed on the substrate 1201.

Figure 17B:
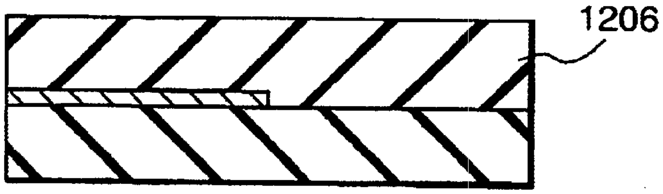

(2) Next, as shown in FIG. 17B, an insulating layer for forming the step-forming member is deposited. The insulating layer may be formed by accumulating, e.g., $SiO_2$ by a sputtering method, however, the insulating layer may be formed by a film-forming method such as a vacuum evaporation method or a printing method.

Figure 17C:
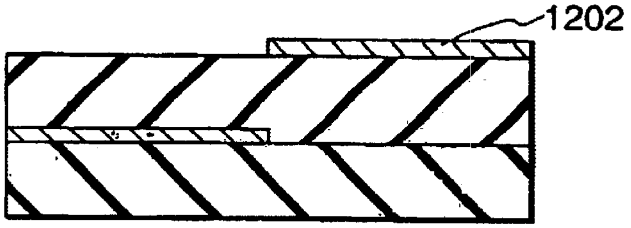

(3) Next, as shown in FIG. 17C, the device electrode 1202 is formed on the insulating layer.

Figure 17D:
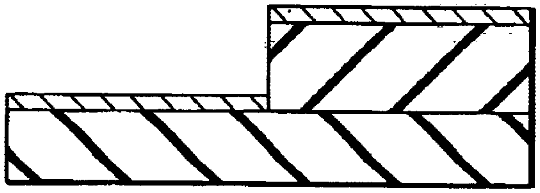

(4) Next, as shown in FIG. 17D, a part of the insulating layer is removed by using, e.g., an etching method, to expose the device electrode 1203.

Figure 17E:
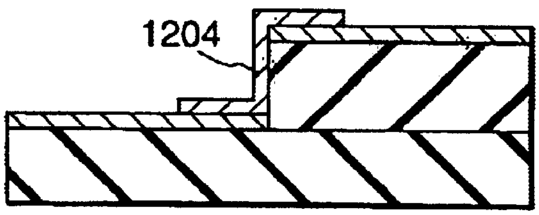

(5) Next, as shown in FIG. 17E, the conductive thin film 1204 is formed using a fine particle film. Upon formation, similar to the above-described flat device structure, a film-forming technique such as an applying method is used.

(6) Next, similar to the flat device structure, the forming processing is performed so as to form the electron-emitting portion 1205 (the forming processing-similar to that explained using FIG. 13C may be performed).

(7) Next, similar to the flat device structure, the activation processing is performed so as to deposit carbon or carbon compound around the electron-emitting portion (activation processing similar to that explained using FIG. 13D may be performed).

Figure 17F:
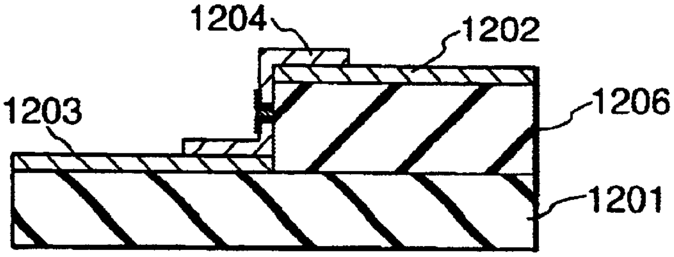

The stepped surface-conduction type electron-emitting device shown in FIG. 17F is manufactured as described above.

(Characteristic of Surface-Conduction Type Electron-Emitting Device Used in Display Apparatus)

The structure and manufacturing method of the flat surface-conduction type electron-emitting device and those of the step surface-conduction type electron-emitting device are as described above. Next, the characteristic of the electron-emitting device used in the display apparatus will be described below.

Figure 18:
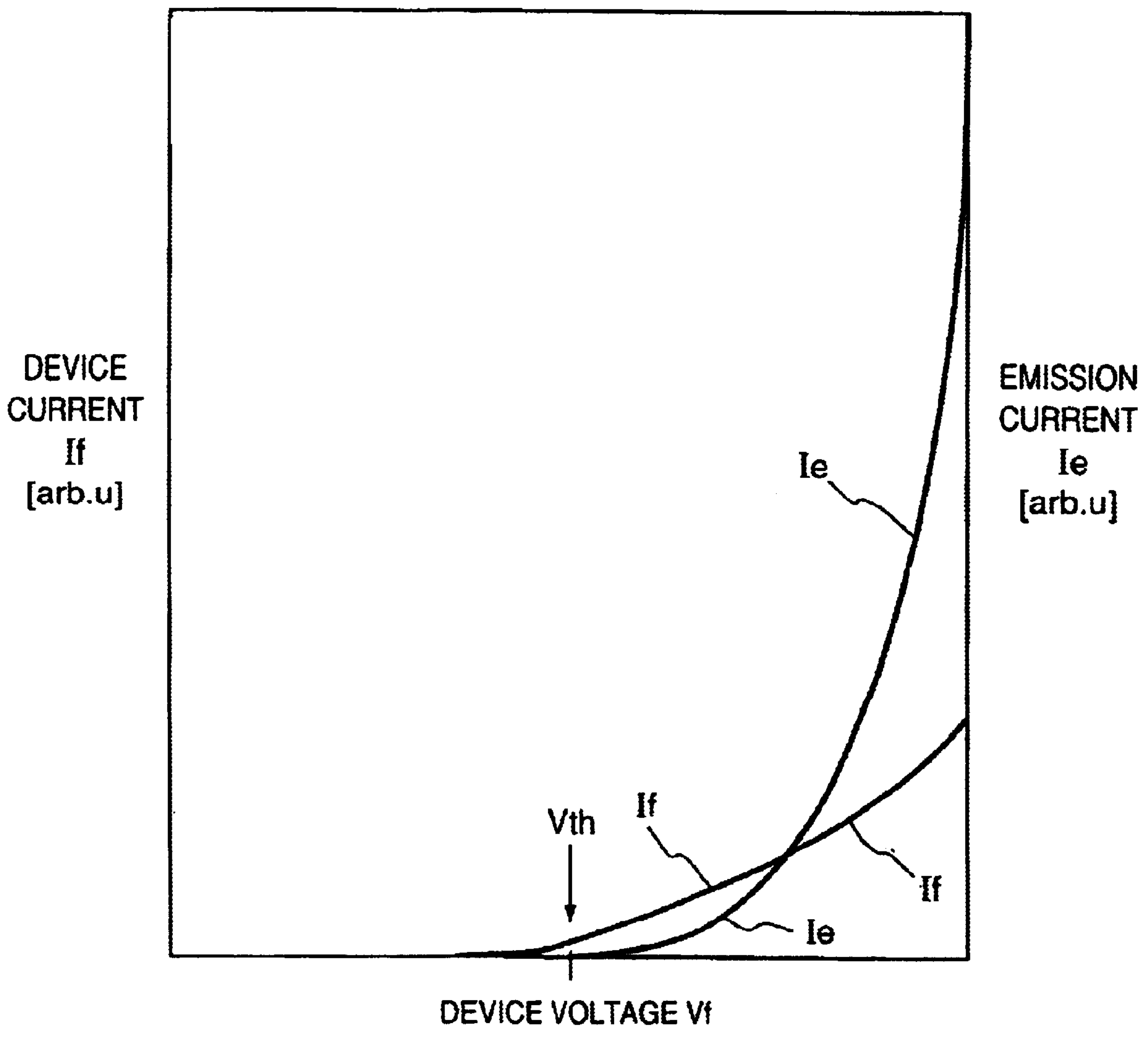
FIG. 18 is a graph showing the typical characteristics of the surface-conduction type electron-emitting device used in the present embodiment.

FIG. 18 shows a typical example of (emission current Ie) to (device voltage (i.e., voltage to be applied to the device) Vf) characteristic and (device current If) to (device application voltage Vf) characteristic of the device used in the display apparatus of this embodiment. Note that compared with the device current If, the emission current Ie is very small, therefore it is difficult to illustrate the emission current Ie by the same measure of that for the device current If. In addition, these characteristics change depending on changes in designing parameters, such as the size or shape of the device. For these reasons, the two lines in the graph of FIG. 18 are respectively given in arbitrary units.

Regarding the emission current Ie, the device used in the display apparatus has three characteristics, as follows:

First, when voltage of a predetermined level (referred to as "threshold voltage Vth") or greater is applied to the device, the emission current Ie drastically increases, however, with voltage lower than the threshold voltage Vth, almost no emission current Ie is detected. That is, regarding the emission current Ie, the device has a nonlinear characteristic based on the clear threshold voltage Vth.

Second, the emission current Ie changes in dependence upon the device application voltage Vf. Accordingly, the emission current Ie can be controlled by changing the voltage Vf.

Third, the emission current Ie is output quickly in response to application of the voltage Vf to the device. Accordingly, an electrical charge number of electrons to be emitted from the device can be controlled by changing the period of application of the device voltage Vf.

The surface-conduction type electron-emitting device with the above three characteristics is preferably applied to the display apparatus. For example, in a display apparatus having a large number of devices provided corresponding to the number of pixels of a display screen, if the first characteristic is utilized, display by sequential scanning of the display screen is possible. This means that the threshold voltage Vth or greater is appropriately applied to a driven device, while voltage lower than the threshold voltage Vth is applied to an unselected device. In this manner, sequentially changing the driven devices enables display by sequential scanning of the display screen.

Further, the light emission brightness can be controlled by utilizing the second or third characteristic, which enables multi-gradation display.

(Structure of Multi Electron Source with Many Devices Wired in Simple Matrix)

Next, the structure of a multi-electron-source having the above-described surface-conduction type electron-emitting devices arranged on the substrate in a simple matrix will be described below.

Figure 19:
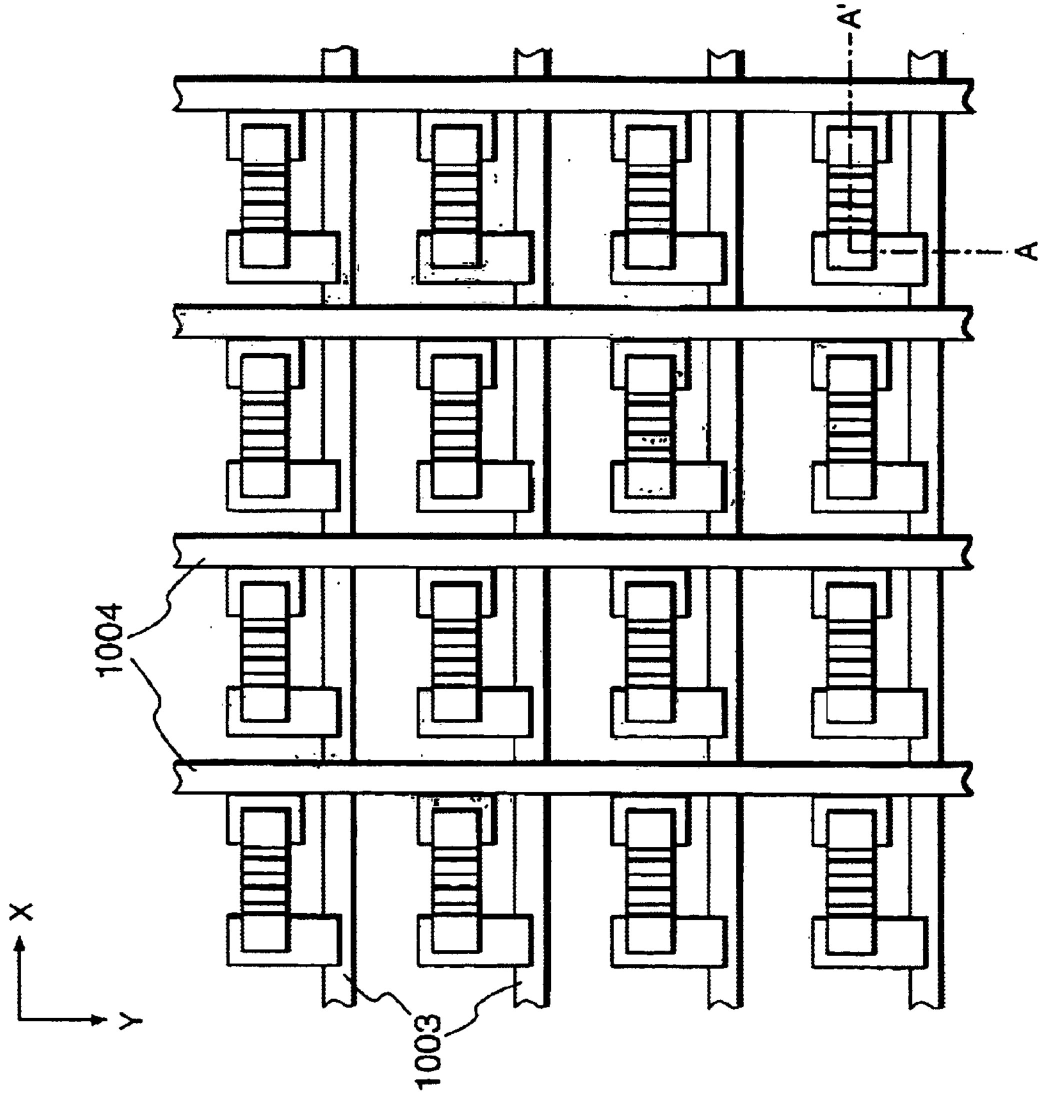
FIG. 19 is a plan view showing part of the multi-electron-source substrate used in the present embodiment.

FIG. 19 is a plan view of the multi-electron-source used in the display panel 1000 in FIG. 10. There are surface-conduction type electron-emitting devices like the one shown in FIGS. 12A and 12B on the substrate 1001. These devices are arranged in a simple matrix with the row- and column-direction wirings 1003 and 1004. At an intersection of the row- and column-direction wirings 1003 and 1004, an insulating layer (not shown) is formed between the wires, to maintain electrical insulation.

Figure 20:
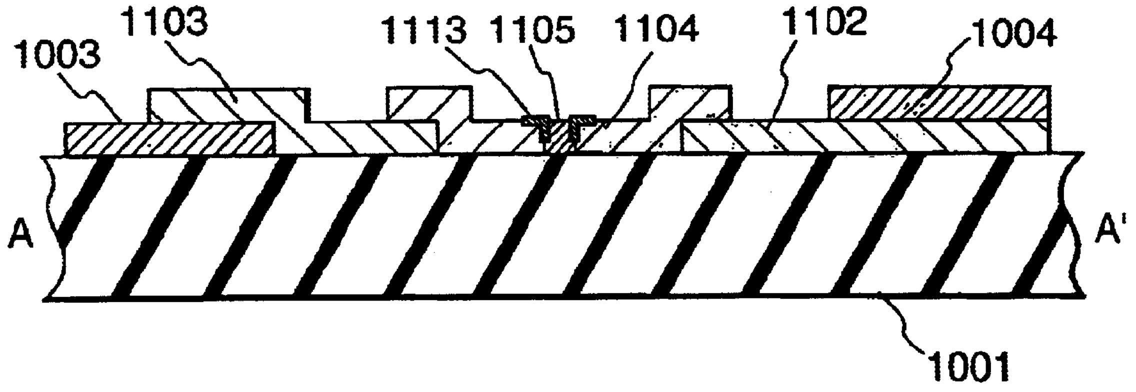
FIG. 20 is a sectional view of the multi-electron-source substrate used in the present embodiment when taken along the line A-A' in FIG. 19.

FIG. 20 shows a section cutout along the line A-A' in FIG. 19.

Note that a multi-electron-source having such a structure is manufactured by forming the row- and column-direction wiring electrodes 1003 and 1004, the inter-electrode insulating layers (not shown), and the device electrodes and conductive thin films of the surface-conduction type electron-emitting devices on the substrate, then supplying electricity to the respective devices via the row- and column-direction wiring electrodes 1003 and 1004, thus performing the forming processing and the activation processing.

Figure 21:
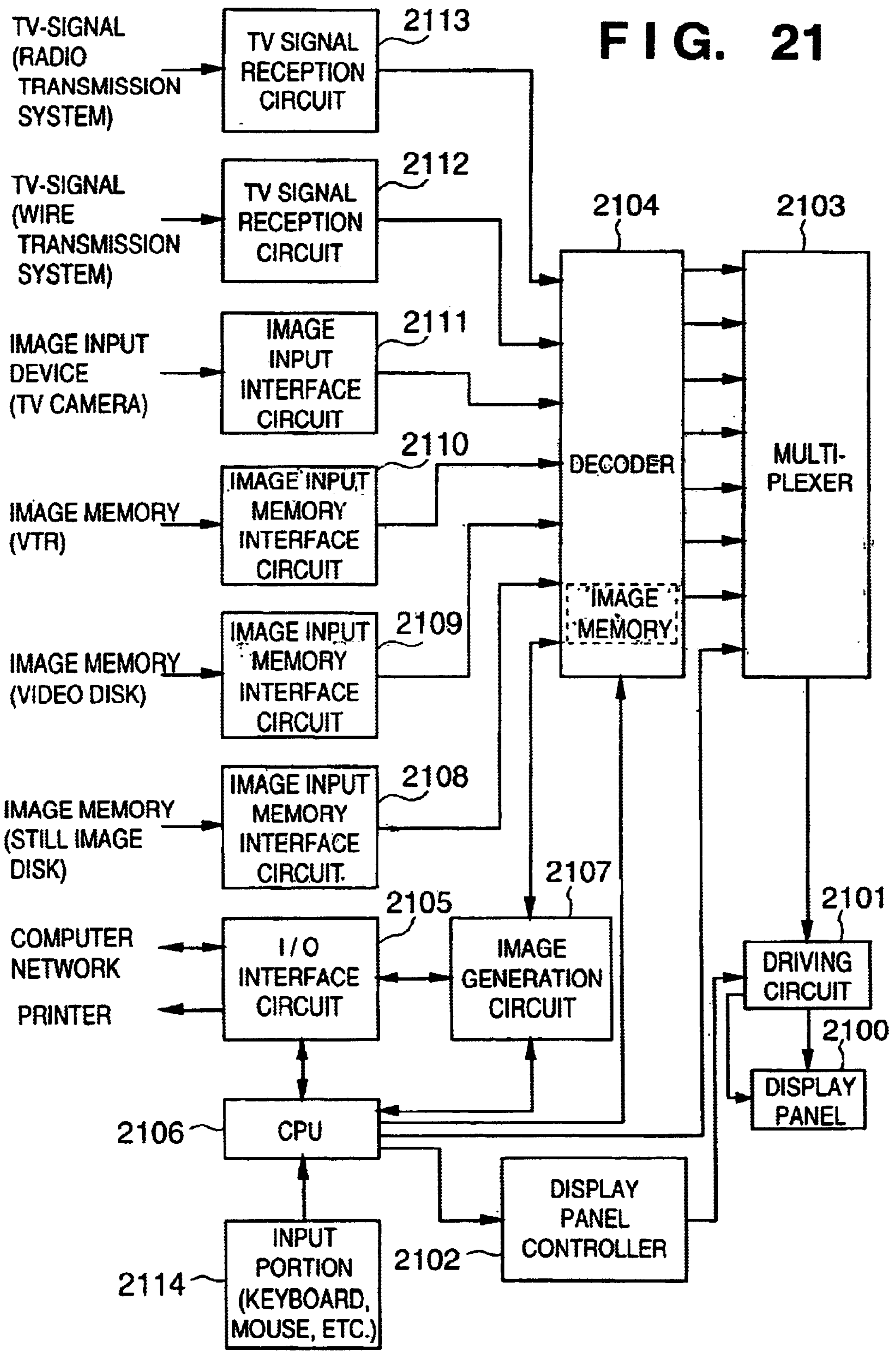
FIG. 21 is a block diagram showing a multi-functional image display apparatus using the image display apparatus according to the present embodiment of the present invention.
Figure 22:
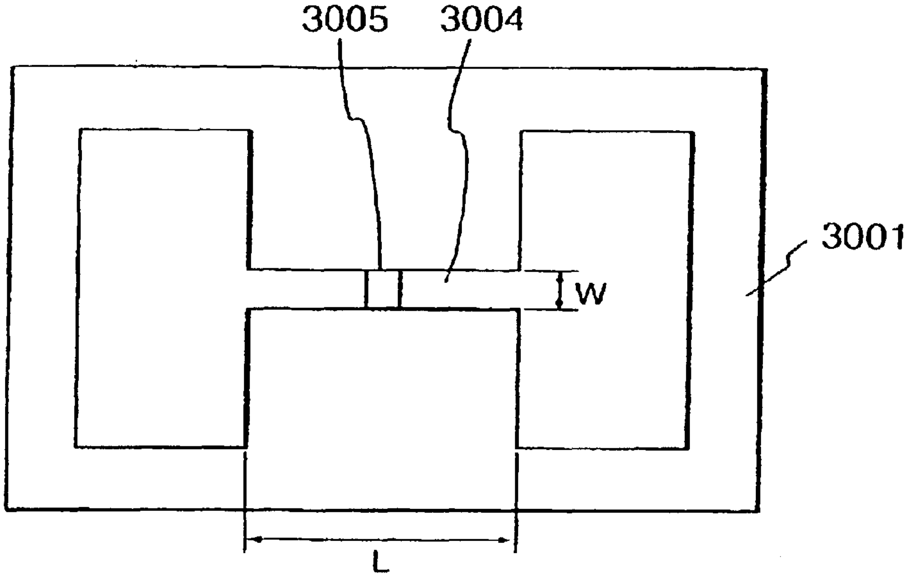
FIG. 22 PRIOR ART
FIG. 22 is a plan view showing an example of a conventionally known surface-conduction type electron-emitting device.
Figure 23:
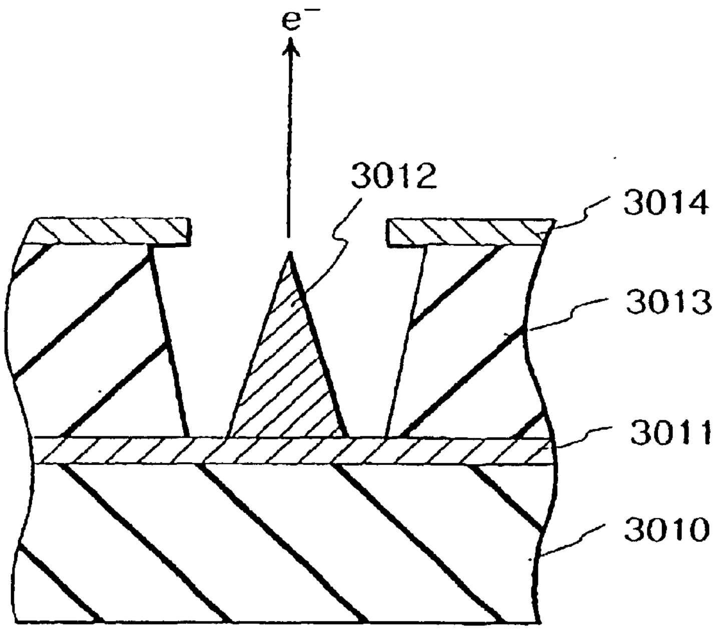
FIG. 23 PRIOR ART
FIG. 23 is a sectional view showing an example of a conventionally known FE type device.
Figure 24:
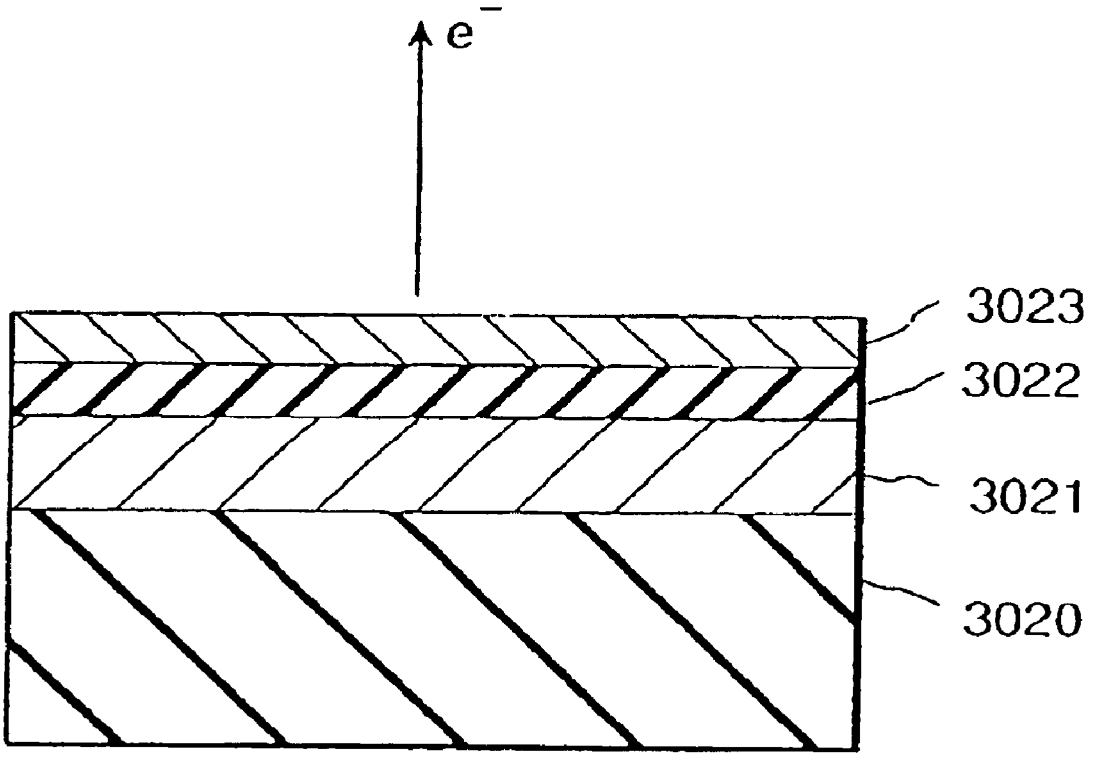
FIG. 24 PRIOR ART
FIG. 24 is a sectional view showing an example of a conventionally known MIM type device.
Figure 25:
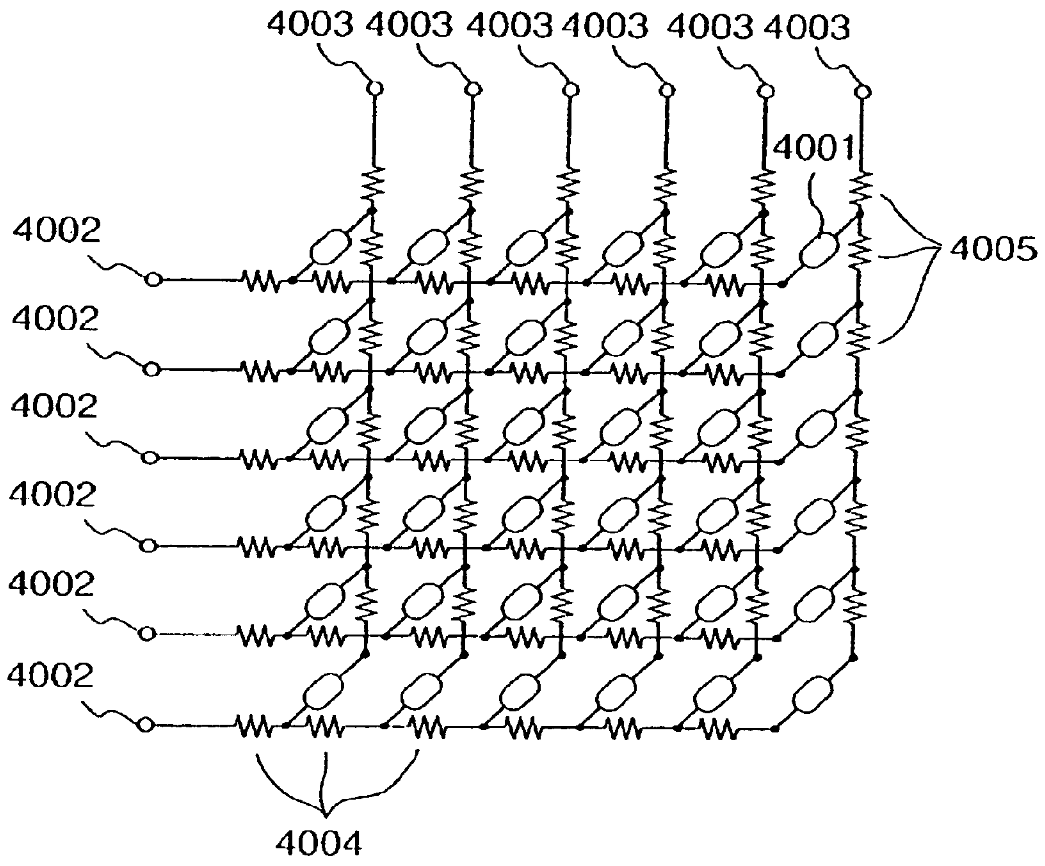
FIG. 25 PRIOR ART
FIG. 25 is a view for explaining an electron-emitting device wiring method in the present embodiment.

FIG. 21 is a block diagram showing an example of a multi-functional display apparatus capable of displaying image information provided from various image information sources such as television broadcasting on a display panel using the surface-conduction type electron-emitting device as an electron source. Referring to FIG. 21, numeral 2100 denotes a display panel; numeral 2101 denotes a driving circuit for the display panel; numeral 2102 denotes a display panel controller; numeral 2103 denotes a multiplexer; numeral 2104 denotes a decoder; numeral 2105 denotes an I/O interface circuit; numeral 2106 denotes a CPU; numeral 2107 denotes an image generation circuit; numerals 2108, 2109, and 2110 denote image memory interface circuits; numeral 2111 denotes an image input interface circuit; numerals 2112 and 2113 denote TV signal reception circuits; and numeral 2114 denotes an input portion.

In this display apparatus, upon reception of a signal containing both video information and audio information, such as a television signal, the video information is displayed while the audio information is reproduced. (A description of a circuit or a speaker for reception, division, reproduction, processing, storage, or the like, of the audio information, which is not directly related to the features of the present invention, will be omitted.) The functions of the respective parts will be explained in accordance with the flow of an image signal.

The TV signal reception circuit 2113 receives a TV image signal transmitted using a radio transmission system, such as radio waves or spatial optical communication. The scheme of the TV signal to be received is not particularly limited, and is the NTSC scheme, the PAL scheme, the SECAM scheme, or the like. A more preferable signal source, which takes advantage of the display panel realizing a large area and a large number of pixels, is a TV signal (e.g., a so-called high-quality TV of the MUSE scheme or the like) made up of a larger number of scanning lines than that of the TV signal of the above scheme. The TV signal received by the TV signal reception circuit 2113 is output to the decoder 2104.

The TV signal reception circuit 2112 receives a TV image signal transmitted using a wire transmission system such as a coaxial cable or an optical fiber. The scheme of the TV signal to be received is not particularly limited, as in the TV signal reception circuit 2113. The TV signal received by the circuit 2112 is also output to the decoder 2104.

The image input interface circuit 2111 receives an image signal supplied from an image input device, such as a TV camera or an image read scanner, and outputs it to the decoder 2104.

The image memory interface circuit 2110 receives an image signal stored in a video tape recorder (to be briefly referred to as a VTR hereinafter), and outputs it to the decoder 2104.

The image memory interface circuit 2109 receives an image signal stored in a video disk, and outputs it to the decoder 2104.

The image memory interface circuit 2108 receives an image signal from a device storing still image data, such as a so-called still image disk, and outputs the received still image data to the decoder 2104.

The I/O interface circuit 2105 connects the display apparatus to an external computer, a computer network, or an output device, such as a printer. The I/O interface circuit 2105 enables input/output of image data, character data, and graphic information, and in some cases the input/output of a control signal and numerical data between the CPU 2106 of the display apparatus and an external device.

The image generation circuit 2107 generates display image data on the basis of image data or character/graphic information externally input via the I/O interface circuit 2105, or image data or character/graphic information output from the CPU 2106. This circuit 2107 incorporates circuits necessary to generate images, such as a programmable memory for storing image data and character/graphic information, a read-only memory storing image patterns corresponding to character codes, and a processor for performing image processing. Display image data generated by the circuit 2107 is output to the decoder 2104. In some cases, display image data can also be input/output from/to an external computer network or a printer via the I/O interface circuit 2105.

The CPU 2106 mainly performs control of the operation of this display apparatus, and operations about generation, selection, and editing of display images.

For example, the CPU 2106 outputs a control signal to the multiplexer 2103 to properly select or combine image signals to be displayed on the display panel. At this time, the CPU 2106 generates a control signal to the display panel controller 2102 in accordance with the image signals to be displayed, and appropriately controls the operation of the display apparatus in terms of the screen display frequency, the scanning method (e.g., interlaced or non-interlaced scanning), the number of scanning lines for one frame, and the like.

The CPU 2106 directly outputs image data or character/graphic information to the image generation circuit 2107. In addition, the CPU 2106 accesses an external computer or a memory via the I/O interface circuit 2105 to input image data or character/graphic information.

The CPU 2106 may also be involved with operations for other purposes. For example, the CPU 2106 can be directly involved with the function of generating and processing information, like a personal computer or a wordprocessor.

Further, the CPU 2106 may be connected to an external computer network via the I/O interface circuit 2105 so as to perform an operation such as numerical calculation in cooperation with an external device.

The input portion 2114 allows the user to input an instruction, a program, or data to the CPU 2106. As the input portion 2114, various input devices, such as a joystick, a bar code reader, and a speech recognition device, are available in addition to a keyboard and a mouse.

The decoder 2104 inversely converts various image signals input from the circuits 2107 to 2113 into three primary color signals, or a luminance signal and I and Q signals. As is indicated by the dotted line in FIG. 21, the decoder 2104 desirably incorporates an image memory in order to process a television signal of the MUSE scheme or the like which requires an image memory in inverse conversion. This image memory advantageously facilitates display of a still image, or image processing and editing such as thinning, interpolation, enlargement, reduction, and synthesis of images in cooperation with the image generation circuit 2107 and the CPU 2106.

The multiplexer 2103 appropriately selects a display image on the basis of a control signal input from the CPU 2106. More specifically, the multiplexer 2103 selects a desired one of the inversely converted image signals input from the decoder 2104, and outputs the selected image signal to the driving circuit 2101. In this case, the image signals can be selectively switched within a 1-frame display time to display different images in a plurality of areas of one frame as in a so-called multi-window television.

The display panel controller 2102 controls the operation of the driving circuit 2101 on the basis of a control signal input from the CPU 2106.

As for the basic operation of the display panel, the display panel controller 2102 outputs, e.g., a signal for controlling the operation sequence of a driving power source (not shown) of the display panel to the driving circuit 2101. As for the method of driving the display panel, the display panel controller 2102 outputs, e.g., a signal for controlling the screen display frequency or the scanning method (e.g., interlaced or non-interlaced scanning) to the driving circuit 2101.

In some cases, the display panel controller 2102 outputs to the driving circuit 2101 a control signal associated with adjustment of the image quality, such as the brightness, contrast, color tone, or sharpness of a display image.

The driving circuit 2101 generates a driving signal to be applied to the display panel 2100, and operates based on an image signal input from the multiplexer 2103 and a control signal input from the display panel controller 2102.

The functions of the respective parts have been described. The arrangement of the display apparatus shown in FIG. 21 makes it possible to display image information input from various image information sources on the display panel 2100. More specifically, various image signals, such as television broadcasting image signals, are inversely converted by the decoder 2104, appropriately selected by the multiplexer 2103, and supplied to the driving circuit 2101. On the other hand, the display controller 2102 generates a control signal for controlling the operation of the driving circuit 2101 in accordance with an image signal to be displayed. The driving circuit 2101 applies a driving signal to the display panel 2100 on the basis of the image signal and the control signal. As a result, the image is displayed on the display panel 2100. A series of operations are systematically controlled by the CPU 2106.

In this display apparatus, the image memory incorporated in the decoder 2104, the image generation circuit 2107, and the CPU 2106 can cooperate with each other to simply display selected ones of a plurality of pieces of image information and to perform, for the image information to be displayed, image processing such as enlargement, reduction, rotation, movement, edge emphasis, thinning, interpolation, color conversion, and conversion of the aspect ratio of an image, and image editing, such as synthesis, erasure, connection, exchange, and pasting. Although not described in this embodiment, an audio circuit for processing and editing audio information may be arranged, similar to the image processing and the image editing.

The display apparatus can therefore have the functions of a display device for television broadcasting, a terminal device for video conferences, an image editing device processing still and dynamic images, a terminal device for a computer, an office terminal device, such as a wordprocessor, a game device, and the like. Such display apparatuses are useful for industrial and business purposes and can be variously applied.

FIG. 21 merely shows an example of the arrangement of the display apparatus using a display panel having a surface-conduction type electron-emitting device as an electron source. The present invention is not limited to this, as a matter of course. For example, among the constituent members in FIG. 21, a circuit associated with a function unnecessary for the application purpose can be eliminated from the display apparatus. To the contrary, another constituent member can be added to the display apparatus in accordance with the application purpose. For example, when this display apparatus is used as a television telephone set, transmission and reception circuits including a television camera, an audio microphone, lighting, an a modem are preferably added as constituent members.

In this display apparatus, particularly since a display panel using a surface-conduction type electron-emitting device as an electron source can be easily made thin, the width of the overall display apparatus can be decreased. In addition to this, a display panel using the surface-conduction type electron-emitting device as an electron source is easily increased in screen size and has a high brightness and a wide view angle. This display apparatus can therefore display an impressive image with reality and high visibility.

As described above, according to the above embodiments, a desired brightness distribution can be provided in accordance with a position in the display area on the display panel. The brightness can be adjusted while maintaining a brightness distribution corresponding to a position in the display area.

Such a brightness distribution as to give a high brightness to the center of the display area and a low brightness to the peripheral portion can correct variations in brightness arising from the resistance of the wiring.

In general, the video signal is formed so as to locate important information at the center of the display. For this reason, when the average brightness of the display panel is controlled so as not to exceed a given level in order to suppress the power consumption of the apparatus and the temperature rise of a light-emitting surface, the display panel preferably has a brightness distribution in which the center is bright at the same average power, rather than a case in which brightness of the entire display area is uniformly suppressed. This is because important information included in the video signal can be displayed at a high brightness to provide an image display apparatus for displaying an easy-to-see image.

When the row wiring lines of the display panel constituted by arranging many electron-emitting devices in a matrix are sequentially driven, the light emission quantity may decrease much more in a display area located apart from the voltage-applied terminal of a row wiring owing to a voltage drop generated on the row wiring. This problem can be solved by giving a desired brightness distribution corresponding to a display area, i.e., increasing the brightness at a position remote from the voltage-applied terminal, as described above.

The amount of voltage drop due to the resistance of the wiring is larger as the current flowing through the wiring is larger, i.e., the level of an input video signal is higher. Variations in brightness caused by the resistance of the wires can therefore be corrected by detecting an average video level and controlling the brightness so as to provide a brightness distribution corresponding to a position in the display area in accordance with the average level.

As has been described above, according to the present invention, the brightness distribution can be corrected.

According to the present invention, only the brightness of a desired portion of a displayed image or the brightness of a portion corresponding to the resistance of wire can be controlled.

According to the present invention, the brightness distribution can be preferably suppressed while the power consumption and temperature rise are suppressed.

According to the present invention, the brightness level of an image signal corresponding to a desired portion on the display panel can be set higher than the brightness level of an image signal corresponding to the remaining portion so as to display an image free from any sense of incompatibility.

As many apparently widely different embodiments of the present invention can be made without departing from the spirit and scope thereof, it is to be understood that the invention is not limited to the specific embodiments thereof except as defined in the appended claims.

What is claimed is:

1. An image display apparatus, comprising:

an image display member having a plurality of light-emitting portions arranged in a two-dimensional arrangement;

a plurality of electron emitting devices arranged on a substrate, in correspondence with each of the plurality of light-emitting portions, for causing emission of light from each of the plurality of light-emitting portions; and a circuit that adjusts at least one of a plurality of input signals each of which corresponds with one of the plurality of electron emitting devices, wherein adjustment by said circuit includes an adjustment in which a light emitting brightness caused by an electron emitting device in a first position and a light emitting brightness caused by an electron emitting device in a second position different from the first position are different from each other, in a case where an input signal corresponding with an electron emitting device in the first position designates the same brightness as that of an input signal corresponding with an electron emitting device in the second position.

2. An apparatus comprising:

a plurality of light-emitting portions arranged in a two-dimensional arrangement;

a plurality of devices arranged on a substrate, in correspondence with each of the plurality of light emitting portions, for causing emission of light from each of the plurality of light emitting portions; and a circuit that adjusts at least one input signal out of a plurality of input signals each of which corresponds with one of said plurality of devices, wherein adjustment by said circuit includes an adjustment in which a light emitting brightness caused by an electron emitting device in a first position is different from a light emitting brightness caused by an electron emitting device in a second position different from the first position, in a case where an input signal corresponding with an electron emitting device in the first position designates the same brightness as that of an input signal corresponding with an electron emitting device in the second position.

3. An apparatus according to claim 1, wherein said circuit adjusts the light emitting brightness of the plurality of light-emitting portions at different positions such that a distribution of brightness is generated on an image display member of the apparatus, when the input image signal designates the same brightness for the plurality of light-emitting portions at the different positions.

4. An apparatus according to claim 2, wherein said circuit adjusts the light emitting brightness of the plurality of light-emitting portions at different positions such that a distribution of brightness is generated on an image display member on which the plurality of light emitting portions are arranged in a two-dimensional arrangement, when the input image signal designates the same brightness for the plurality of light-emitting portions at the different positions.

* * * * *

UNITED STATES PATENT AND TRADEMARK OFFICE

CERTIFICATE OF CORRECTION

PATENT NO. : 6,947,018 B1
DATED : September 20, 2005
INVENTOR(S) : Tatsuro Yamazaki It is certified that error appears in the above-identified patent and that said Letters Patent is hereby corrected as shown below:

Title page,
Item [56], References Cited, OTHER PUBLICATIONS, insert
-- M.I. Elinson, et al., "Radio Engineering and Electron Physics", pages 1290 to 1296 (August, 1965).
G. Dittmer, "Thin Solid Films", pages 317 to 328 (1972).
W.P. Dyke and W.W. Dolan, "Advances in Electronics and Electron Physics", pages 89 to 185 (1956).
C.A. Spindt, "Physical properties of thin-film field emission cathodes with molybdenum cones," Volume 47, No. 12, pages 5248 to 5263 (December, 1976).
C.A. Mead, "Operation of Tunnel-Emission Devices", Volume 32, No. 4, pages 646 to 652 (April, 1961). --.

Column 2,
Line 9, "electron-emittina" should read -- electron-emitting --.
Line 13, "molybdenium" should read -- molybdenum --.

Column 5,
Line 30, "in ce" should read -- in accordance --.

Column 9,
Line 37, "users" should read -- user's --.

Column 12,
Line 40, "the-average" should read -- the average --.

Column 13,
Line 59, "is not" should read -- are not --.

Column 14,
Line 23, "multi-electron-source" should read -- multi-electron-source; --.
Line 31, "$10_{-7}$" should read -- $10^{-7}$ --.

Column 15,
Line 15, "104" should read -- 1104 --.

Column 17,
Line 20, "1.102" should read -- 1102 --.

UNITED STATES PATENT AND TRADEMARK OFFICE

CERTIFICATE OF CORRECTION

PATENT NO. : 6,947,018 B1
DATED : September 20, 2005
INVENTOR(S) : Tatsuro Yamazaki It is certified that error appears in the above-identified patent and that said Letters Patent is hereby corrected as shown below:

<u>Column 18,</u>
Line 17, “10-5” should read -- $10^{-5}$ --.

<u>Column 19,</u>
Line 58, “processing-similar” should read -- processing similar --.

Signed and Sealed this

Twenty-eighth Day of February, 2006

JON W. DUDAS
*Director of the United States Patent and Trademark Office*

UNITED STATES PATENT AND TRADEMARK OFFICE

CERTIFICATE OF CORRECTION

PATENT NO. : 6,947,018 B1

APPLICATION NO. : 09/218095

DATED : September 20, 2005

INVENTOR(S) : Tatsuro Yamazaki

It is certified that error appears in the above-identified patent and that said Letters Patent is hereby corrected as shown below:

ON THE TITLE PAGE, at Item (56), Foreign Patent Documents:

--JP 64-31332 2/1989-- should be inserted.

ON THE TITLE PAGE, at Item (56), Other Publications:

--Meyer, R., et al., "Recent Developments on "Microtips" Display At Leti", Technical Digest of IVMC 91, Nagahama, pp. 6-9 (1991).-- should be inserted.

Signed and Sealed this

First Day of August, 2006

JON W. DUDAS

*Director of the United States Patent and Trademark Office*